(12) United States Patent
Kito

(10) Patent No.: US 6,608,823 B1
(45) Date of Patent: Aug. 19, 2003

(54) CDMA MOBILE COMMUNICATION SYSTEM AND SERVICE AREA

(75) Inventor: Eiji Kito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/398,419

(22) Filed: Sep. 17, 1999

(30) Foreign Application Priority Data

Sep. 18, 1998 (JP) .......................................... 10-264669

(51) Int. Cl.[7] .................................................. H04Q 7/20
(52) U.S. Cl. ....................... 370/331; 370/332; 370/335; 455/436; 455/435; 455/439; 455/440; 455/443
(58) Field of Search ................................. 370/252, 331, 370/332, 335; 455/436, 438, 439, 440, 443

(56) References Cited

U.S. PATENT DOCUMENTS 5,790,528 A    8/1998   Muszynski
5,991,629 A  * 11/1999  Agrawal et al. ............ 455/446

FOREIGN PATENT DOCUMENTS

| EP | 0 923 259 A3 | 6/1996 |
| JP | 5-4644 | 1/1993 |
| JP | 6-245261 | 9/1994 |
| JP | 7-193856 | 7/1995 |
| JP | 8-503114 | 4/1996 |
| JP | 8-289366 | 11/1996 |
| JP | 9-511107 | 11/1997 |
| WO | WO 96/08936 | 3/1996 |

* cited by examiner

Primary Examiner—William Trost
Assistant Examiner—Eugene Yun
(74) Attorney, Agent, or Firm—Sughrue Mion, PLLC

(57) ABSTRACT

A base station BTS1 includes a mobile station-directing measuring/comparing section 171 for selectively outputting a hand-over request signal on the basis of data indicative of the received power level of a talk signal or packet signal 101 from a mobile station MS1. A base station control unit BSC includes a station arrangement information table 105, and selects in response to a hand-over request signal a supplementary base station SBTS1 that executes the hand-over and outputs an operation start command. The base station control unit also outputs a supplementary base station power measurement command when a first identification signal is outputted, and therefore the mobile station selectively outputs a supplementary base station measurement result signal on the basis of data indicative of the received power level of the first identification signal. The base station control unit further outputs a hand-over execute command. The supplementary base station includes a connection/disconnection control section 131 for generating a control signal in response to the operation start command and setting up a wireless channel to the base station control unit in response to the hand-over execute command and a start/stop control section 133 for outputting a start signal in response to the control signal so that the first identification signal is outputted.

25 Claims, 25 Drawing Sheets

| CORRESPONDENCE BETWEEN BASE STATIONS | ASSIGNMENT OF SUPPLEMENTARY BASE STATIONS |
|---|---|
| BTS1-BTS2 | SBTS1,SBTS2 |
| BTS1-BTS3 | SBTS1,SBTS2 |
| BTS1-BTS4 | SBTS1,SBTS2 |
| ⋮ | ⋮ |

| BTS1:CELL INFORMATION SPREADING CODE | BTS2:CELL INFORMATION SPREADING CODE | BTS3:CELL INFORMATION SPREADING CODE | BTS4:CELL INFORMATION SPREADING CODE |
|---|---|---|---|

FIG.5

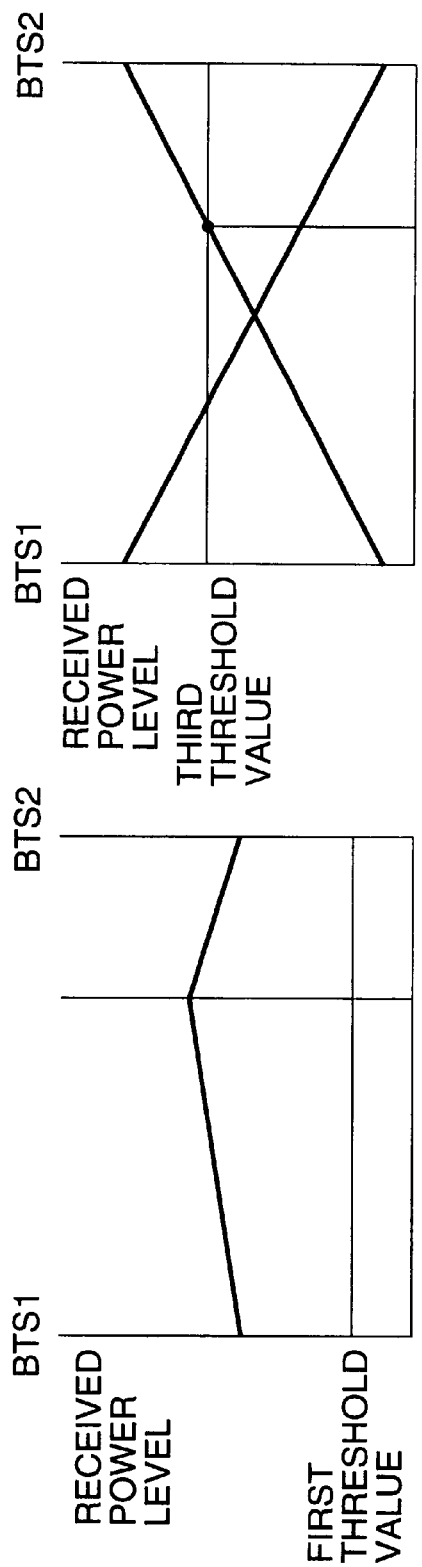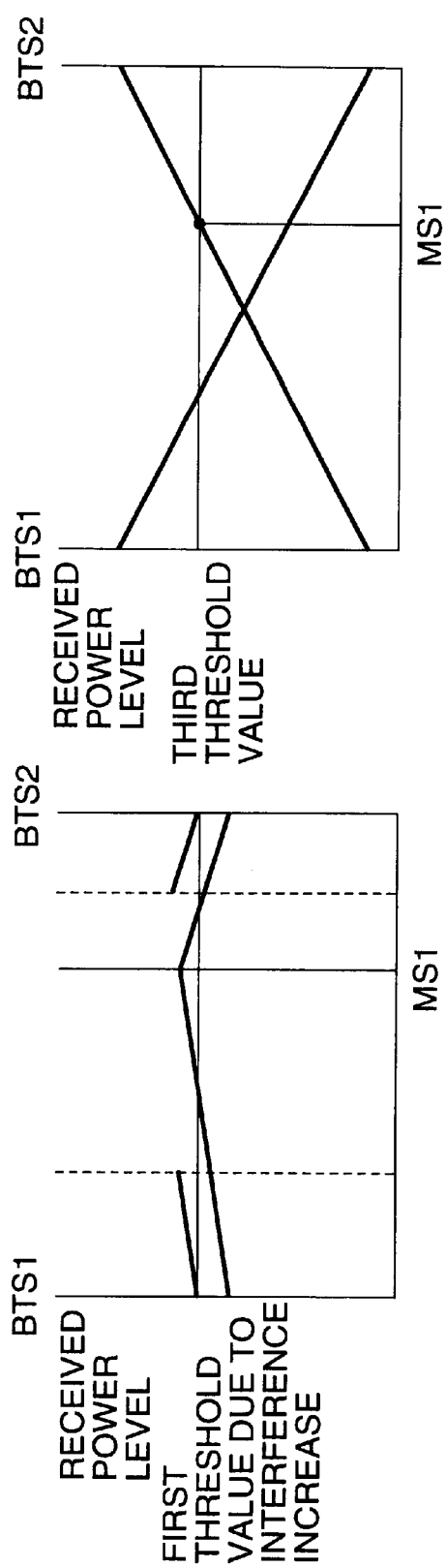

| BTS1:CELL INFORMATION SPREADING CODE | BTS2:CELL INFORMATION SPREADING CODE | BTS3:CELL INFORMATION SPREADING CODE | BTS4:CELL INFORMATION SPREADING CODE | SBTS1:CELL INFORMATION SPREADING CODE | SBTS2:CELL INFORMATION SPREADING CODE |

FIG.21

CDMA MOBILE COMMUNICATION SYSTEM AND SERVICE AREA

BACKGROUND OF THE INVENTION

The present invention relates to a code division multiple access (hereinafter referred to as CDMA) and a method of supplementing a service area.

Various systems such as mobile telephone systems, automobile telephone systems or pager systems are provided as terrestrial mobile communication systems. A demand for such mobile communication systems is increasing at a noticeable rate and frequency assignment is becoming tighter and tighter. For this reason, in the mobile communication systems, an improvement in the efficiency of the utilization of frequencies is desired.

Several prior arts associated with the mobile communication systems will be described below. Japanese Utility Model Laid-Open No. 4644/1993 discloses a mobile communication system for realizing the next talk during congestion.

Japanese Patent Laid-Open No. 245261/1994 discloses an art which relates to a base station selecting method for a cellular wireless telephone system. In accordance with this base station selecting method, in an area covered by a general base station, an auxiliary base station is disposed for a particular region where a temporal traffic variation is large or for a singular location where channel switching continuously occurs. The auxiliary base station has only a common control wireless channel but has no wireless talk channels. A control station controls both the general base station and the auxiliary base station.

Japanese Patent Laid-Open No. 193856/1995 discloses an art which relates to a wireless base station-accommodated exchange system which is, even if communication becomes impossible in a service area of one wireless base station, capable of extending the service area of another wireless base station to eliminate a region which radio waves do not reach.

Japanese Patent Laid-Open No. 289366/1996 discloses an art which minimizes, by the use of equipment which is presently operating, the number of service areas in which communication is impossible, thereby suppressing call losses to remedy call losses which occur due to temporary concentration of traffic and to a malfunction of a wireless base station.

International Patent Publication No. 503114/1996 provides an art which relates to a channel selecting method and a base station for a mobile wireless system. In this mobile wireless system, a master base station exchanges signals with a subscriber station on a control channel which has a down link frequency for sending a signal from the base station to the subscriber station and an up link frequency for sending a signal from the subscriber station to the base station. An additional base station monitors the subscriber station at the up link frequency of the control channel of the master base station. To select the best master base station, the additional base station measures the quality of the control channel of a predetermined master station, and selects a master station whose up link frequency of the control channel is to be monitored, on the basis of the quality of the down link frequency of the control channel.

In parallel with the above-described art, an art for improving resistance to cochannel interference is proposed to improve the efficiency of the utilization of frequencies, particularly, spacial utilization efficiency. This art utilizes spread-spectrum techniques and is called a CDMA communication scheme, and has characteristics resistant to cochannel interference.

The CDMA communication scheme is a method of realizing channel separation not by means of time or frequency but by allowing each base station to use a different code (spreading code) in multiple access which enables a plurality of mobile stations (users) to divide and share a transponder or the like by wireless connections from remote locations.

Specifically, the CDMA communication scheme utilizes the fact that spread-spectrum signals are approximately orthogonal. On a transmitting side, information on individual mobile stations is spread (spreading modulation) by spreading codes unique to the respective mobile stations, and the obtained spread-spectrum signals are transmitted in the state of being multiplexed within the same frequency band. On a receiving side, information is extracted by using the spreading code of a desired mobile station (spreading demodulation). Since interference and noise which occur on the receiving side do not correlate with the spreading code, they are eliminated during spreading demodulation.

By adopting the CDMA communication scheme, it becomes possible to reuse the same frequency band at adjacent cells to make spacial utilization efficiency very high, whereby it is possible to improve the efficiency of the utilization of frequencies.

In the CDMA communication scheme, down link channels from base stations to mobile stations are set up as communication paths from one base station to multiple mobile stations, so that interference can be suppressed by making spread-spectrum signals orthogonal to each other.

However, on up link channels from mobile stations to base stations, since individual mobile stations exist at different locations and independently transmit signals, a difference in propagation delay time occur between signals from the mobile stations. For this reason, the orthogonality of codes cannot be maintained and interference is caused in the signals of mobile stations inside a cell and the signals of mobile stations outside a cell. Therefore, in the CDMA communication scheme, on the up link channels, a signal from one mobile station becomes a source of interference with communication at another mobile station.

The quality of mobile communication is determined by $Eb/(No+Io)$, where $Eb$ is the transmission power per bit at a receiver of a base station, $No$ is the thermal noise power per bit at the receiver of the base station, and $Io$ is interference power. As described above, since the interference power $Io$ increases as the number of mobile stations increases, the transmission power $Eb$ needs to be increased to maintain the quality of communication.

When a mobile station is performing communication at its maximum transmission power, the transmission power is impossible to increase. Therefore, if the mobile station desires to maintain the quality of communication, the mobile station needs to travel closer to a base station and reduce propagation losses to increase the $Eb/(No+Io)$ of the receiver of the base station.

In the CDMA communication scheme, as the number of mobile stations which simultaneously perform communication increases in a cell, the radius of the cell reduces. To avoid such cell reduction, it is common practice to arrange base stations to leave a certain margin with respect to the number of base stations predictable in a certain cell area.

However, the method of arranging base stations to leave a traffic margin causes the problem that the number of approach links between an exchange and base stations increases. In addition, if the number of mobile stations suddenly increases, the resultant cell reduction causes the problem that mobile stations cannot receive mobile communication service.

SUMMARY OF THE INVENTION

An object of the present invention is to provide a CDMA mobile communication system which is capable of reducing approach links even in a cell area in which a traffic variation frequently occurs, by operating a supplementary base station only when traffic increases.

Another object of the present invention is to provide a service area supplementing method suited to the CDMA mobile communication system.

A CDMA mobile communication system according to the present invention comprises a mobile station, a base station to be connected to the mobile station by a wireless channel, at least one adjacent base station adjacent to the base station, and a base station control unit to be connected to the base station and to the at least one adjacent base station by wireless channels.

In accordance with one aspect of the present invention, at least one supplementary base station is disposed for covering an area near a boundary of a service area to be covered by the base station and an area near a boundary of a service area to be covered by the at least one adjacent base station.

The base station comprises a mobile station-directing measuring/comparing section for selectively outputting a hand-over request signal indicating that a hand-over to the at least one adjacent base station is impossible, on the basis of data indicative of a received power level of a talk signal or a packet signal from the mobile station.

The base station control unit comprises a station arrangement information table having information indicative of an arrangement of the base station and the at least one supplementary base station with respect to a service area.

The base station control unit refers to the station arrangement information table in response to the hand-over request signal, selects a supplementary base station that executes the hand-over, and outputs to the selected supplementary base station an operation start command which commands the selected supplementary base station to start an operation. When a first identification signal which is information for identifying the selected supplementary base station is outputted from the selected supplementary base station to the mobile station, the base station control unit also outputs a supplementary base station power measurement command so that the mobile station selectively outputs a supplementary base station measurement result signal based on data indicative of a received power level of the first identification signal. The base station control unit further outputs a hand-over execute command in response to the supplementary base station measurement result signal.

The at least one supplementary base station comprises a connection/disconnection control section for generating a control signal in response to the operation start command and for setting up a wireless channel to the base station control unit in response to the hand-over execute command, and a start/stop control section for outputting a start signal in response to the control signal so that the first identification signal is outputted.

A service area supplementing method according to the present invention is applied to the CDMA mobile communication system, and includes a step (a) of selectively outputting a hand-over request signal indicating that a hand-over to at least one adjacent base station is impossible, on the basis of data indicative of a received power level of a talk signal or a packet signal, a step (b) of selecting a supplementary base station that executes the hand-over, in response to the hand-over request signal, and outputting an operation start command which commands the selected supplementary base station to start an operation, and a step (c) of executing the hand-over from the base station to the selected supplementary base station on the basis of data indicative of a received power level of a first identification signal which is outputted from the selected supplementary base station as information for identifying the selected supplementary base station, in response to the operation start command.

BRIEF DESCRIPTION OF THE DRAWINGS

FIG. 5 is a view illustrating one example of an adjacent base station signal shown in FIG. 2;

FIGS. 9A to 9D are views illustrating a cell reduction: FIG. 9A is a view illustrating a received power level which appears at each base station when no cell reduction occurs, FIG. 9B is a view illustrating a received power level which appears at each mobile station when no cell reduction occurs, FIG. 9C is a view illustrating a received power level which appears at each base station when a cell reduction occurs, and FIG. 9D is a view illustrating a received power level which appears at each mobile station when a cell reduction occurs;

FIG. 21 is a view illustrating adjacent station information for use in the fourth embodiment of the present invention;

DESCRIPTION OF THE PREFERRED EMBODIMENTS

Figure 1:
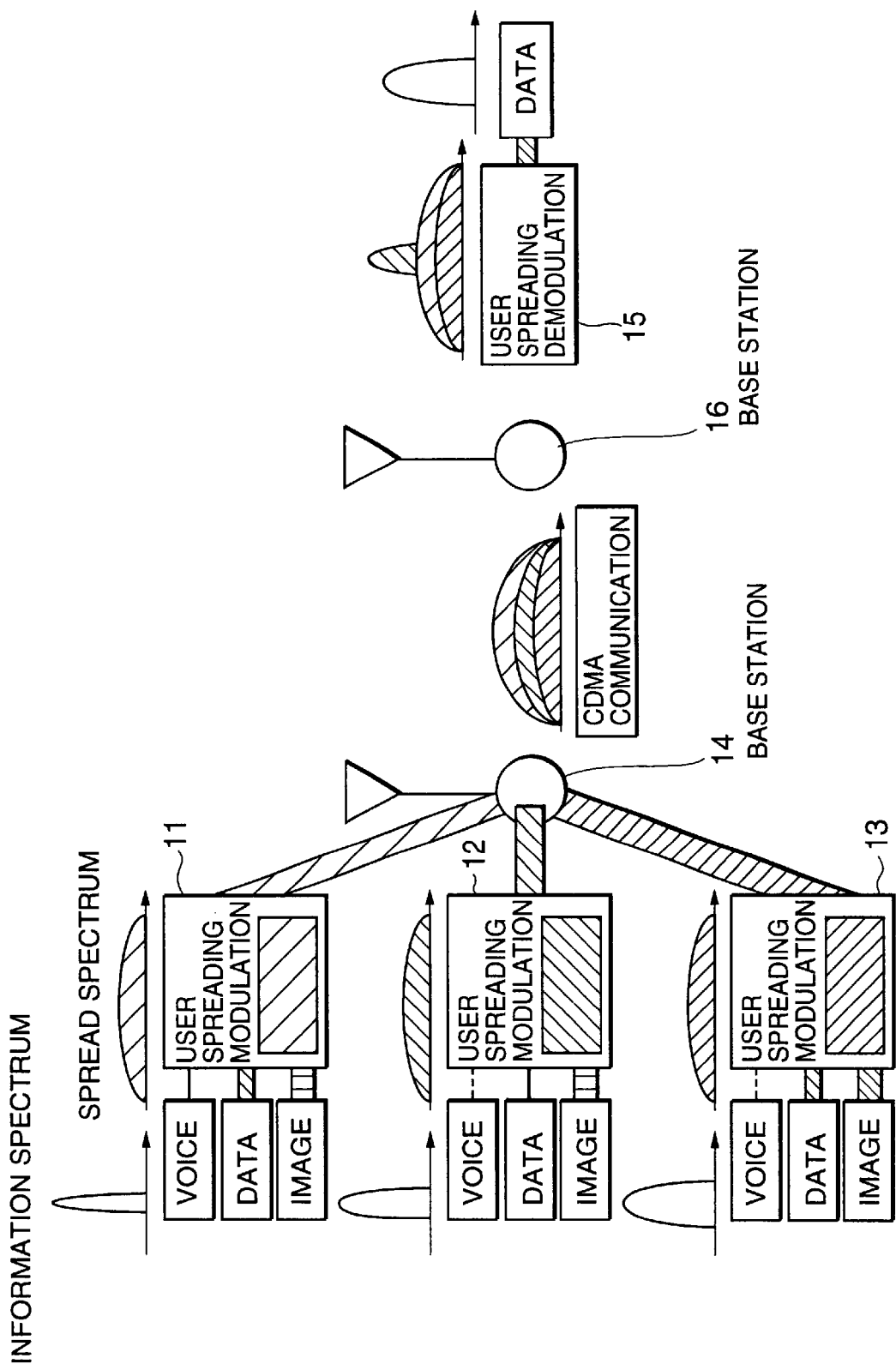
FIG. 1 is a views illustrating the outline of a conventional CDMA communication scheme.

A general CDMA communication scheme will be described below with reference to FIG. 1. On a transmitting side, users 11, 12 and 13 perform spreading modulation on information (voice information, image information and other information) by using spreading codes unique to the respective users 11, 12 and 13, and transmit the obtained spread-spectrum signals. A base station 14 multiplexes these spread-spectrum signals in the same frequency band, and transmits the multiplexed spread-spectrum signal. On a receiving side, a user 15 performs spreading demodulation on the spread-spectrum signal delivered from the base station 16, by using the spreading code of a desired user.

As described previously, in the CDMA communication scheme, as the number of users who simultaneously perform communication increases in a cell, the radius of the cell reduces. To avoid such cell reduction, it is common practice to arrange base stations to leave a certain margin with respect to the number of users predictable in a certain cell area. However, the method of arranging base stations to leave a traffic margin causes the problem that the number of approach links between an exchange and base stations increases. In addition, if the number of users suddenly increases, the resultant cell reduction causes the problem that users cannot receive mobile communication service.

A CDMA mobile communication system and a method of supplementing a service area according to a first embodiment of the present invention will be described below with reference to FIGS. 2 to 11.

Figure 2:
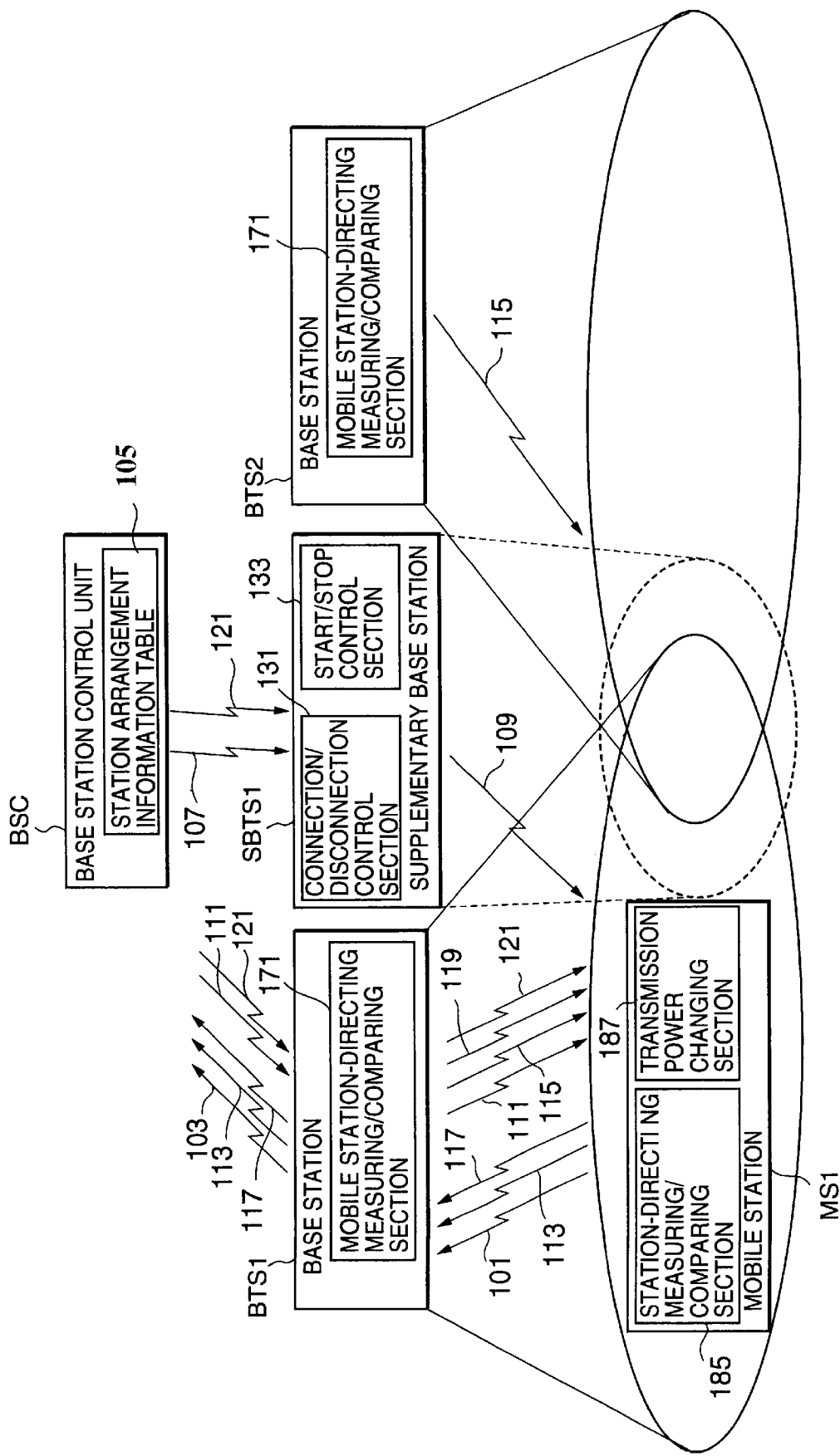
FIG. 2 shows the constitution of a CDMA mobile communication system according to a first embodiment of the present invention.

FIG. 2 shows the constitution of the CDMA mobile communication system according to the first embodiment of the present invention. The CDMA mobile communication system includes a mobile station MSr (r is an integer of not less than 1), a base station BTSm (m is an integer of not less than 1) to be connected to the mobile station MSr by a wireless channel, a supplementary base station SBTSn (n is an integer of not less than 1) to be connected to the mobile station MSr by a wireless channel during a reduction of a cell, and a base station control unit BSC to be connected to the base station BTSm and the supplementary base station SBTSn by a wireless channel.

Incidentally, although FIG. 2 only shows a mobile station MS1, a base station BTS1, a base station BTS2 and a supplementary base station SBTS1 for the sake of simplicity of description, the constitution shown in FIG. 2 is not to be construed as limiting the present invention.

The base station BTS1, the base station BTS2, and the supplementary base station SBTS1 are respectively assigned cells to be covered as service areas. As shown in FIG. 2, the mobile station MS1 exists in the cell to be covered by the base station BTS1.

The base station BTS1 is provided with a mobile station-directing measuring/comparing section 171. The mobile station-directing measuring/comparing section 171 selectively outputs a hand-over request signal 103 in response to a talk signal or packet signal 101 transmitted from the mobile station MS1 on the basis of data indicative of the received power level of the talk signal or packet signal 101. The data indicative of the received power level will be hereinafter referred to as the received power level data. The received power level data includes the received power level, a (desired-wave received power)-to-(interfering-wave received power) ratio which takes an interfering wave into account, and the like.

The hand-over request signal 103 is a signal for informing the base station control unit BSC that a hand-over to a base station adjacent to a base station connected to the mobile station MS1 by a wireless channel is impossible (the former base station corresponds to the base station BTS2 shown in FIG. 2 and will be hereinafter referred to as the adjacent base station, while the latter base station corresponds to the base station BTS1 shown in FIG. 2 and will be hereinafter referred to as the mobile station-associated base station).

Figures 3, 4:
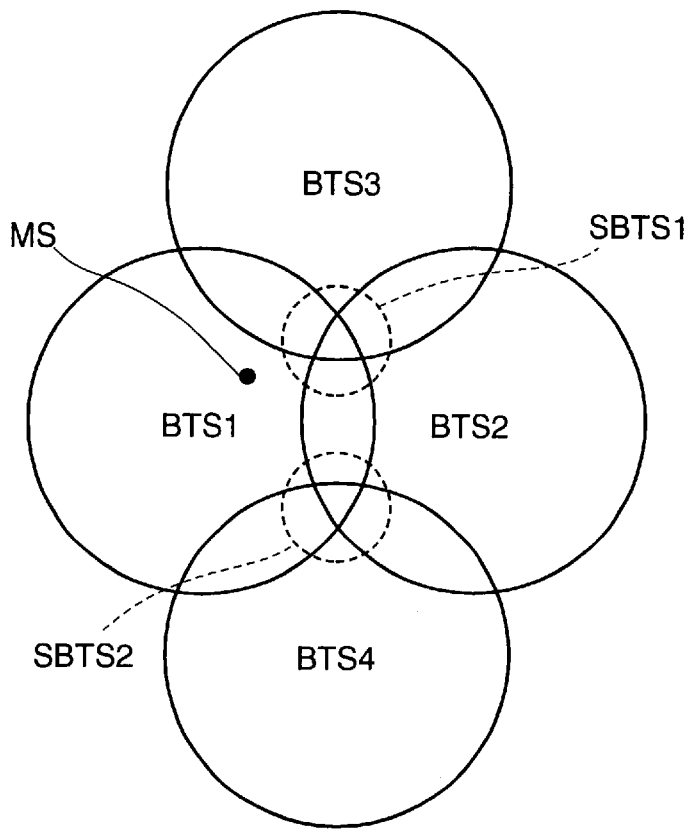
FIG. 3 is a view showing one example of arrangement with respect to service areas of base stations and supplementary base stations.
FIG. 4 is a view illustrating a station arrangement information table shown in FIG. 2.

The base station control unit BSC is provided with a station arrangement information table 105. FIG. 3 shows one example of a station arrangement and the relationship between cells which are respectively covered by individual base stations. FIG. 3 shows a base station BTS3 and a base station BTS4 in addition to the base station BTS1 and the base station BTS2, as well as a supplementary base station SBTS2 in addition to the supplementary base station SBTS1. FIG. 4 is a simple example of the station arrangement information table 105. The station arrangement information table 105 has table information indicative of the arrangement and assignment of the base stations BTS1 to BTS4 and the supplementary base stations SBTS1 and SBTS2 with respect to service areas.

The base station control unit BSC refers to the station arrangement information table 105 in response to the hand-over request signal 103 from the base station BTS1 which is the mobile station-associated base station, and selects a plurality of supplementary base stations to be operated. Then, the base station control unit BSC outputs an operation start command 107 to start the operation of the selected supplementary base station SBTS1. As can be seen from FIG. 4, the plurality of supplementary base stations to be operated are the supplementary base stations SBTS1 and SBTS2, but FIG. 2 shows only the supplementary base station SBTS1.

The supplementary base station SBTS1 outputs a supplementary base station signal 109 (a first identification signal) which has information for identifying the supplementary base station SBTS1 itself, to the mobile station MS1 in response to the operation start command 107. When the supplementary base station SBTS1 outputs the supplementary base station signal 109 to the mobile station MS1, the base station control unit BSC outputs a supplementary base station power measurement command 111 to the mobile station MS1 via the base station BTS1. For example, in the case of the supplementary base station SBTS1, the supplementary base station signal 109 is a signal which is composed of cell information on the service area covered by the supplementary base station SBTS1 and a spreading code unique to the supplementary base station SBTS1.

The supplementary base station power measurement command 111 informs the mobile station MS1 of a spreading code for identifying the supplementary base station SBTS1 to be operated. The mobile station MS1 receives the supplementary base station signal 109 by performing spreading modulation in response to the supplementary base station power measurement command 111, and selectively outputs a supplementary base station measurement result signal 113 on the basis of the received power level data of the supplementary base station signal 109.

The mobile station MS1 is provided with a station-directing measuring/comparing section 185. On the basis of the supplementary base station power measurement command 111, the station-directing measuring/comparing section 185 receives the supplementary base station signal 109 and performs spreading modulation thereon, and measures the received power level data of the supplementary base station signal 109 to compare the measured value with a preset threshold value (a second threshold value). If the comparison shows that the received power level data is not lower than the second threshold value, the mobile station MS1 performs spreading modulation on the supplementary base station measurement result signal 113 and outputs the spreading modulated supplementary base station measurement result signal 113 to the base station BTS1 which is the mobile station-associated base station. In addition, the spreading modulated supplementary base station measurement result signal 113 is outputted to the base station control unit BSC via the base station BTS1 and also to the supplementary base station SBTS1.

The mobile station MS1 periodically receives an adjacent base station signal 115 (a second identification signal) from the base station BTS1 by performing spreading demodulation. In the case shown in FIGS. 3 and 4, the adjacent base station signal 115 is a signal composed of cell information on the service areas covered by the respective base stations BTS2 to BTS4 adjacent to the base station BTS1 which is the mobile station-associated base station, and spreading codes unique to the respective adjacent base stations BTS2 to BTS4, as shown in FIG. 5.

The mobile station MS1 checks the spreading codes unique to the respective adjacent base stations which are contained in the adjacent base station signal 115 from the base station BTS1, and performs spreading demodulation on the spreading codes and periodically receives the adjacent base station signal 115 from each of the adjacent base stations (only the base station BTS2 is shown in FIG. 2).

The station-directing measuring/comparing section 185 measures the received power level data of the adjacent base station signal 115 and compares the measured data with a preset threshold value (a third threshold value). If the comparison shows that the received power level data of the adjacent base station signal 115 is not lower than the third threshold value, the mobile station MS1 performs spreading modulation on an adjacent base station measurement result signal 117 and outputs the modulated base station measurement result signal 117 to the base station control unit BSC via the base station BTS1.

The mobile station MS1 is further provided with a transmission power changing section 187. The transmission power changing section 187 receives a mobile station power control signal 119 from the base station BTS1 by means of spreading demodulation and also receives a mobile station power control signal from the supplementary base station SBTS1, and executes a change of transmission power on an up link channel by decoding a command indicative of a change value of transmission power.

In response to the supplementary base station measurement result signal 113 from the base station BTS1, the base station control unit BSC outputs a hand-over execute command 121 to the base station BTS1 and also to the mobile station MS1 via the base station BTS1 as well as to the supplementary base station SBTS1. The hand-over execute command 121 represents a notice to the effect that a hand-over from the mobile station-associated base station (the base station BTS1, in FIG. 2) to the supplementary base station to be operated (only the supplementary base station SBTS1 is shown in FIG. 2) is to be executed.

The supplementary base station SBTS1 includes a connection/disconnection control section 131 and a start/stop control section 133. The connection/disconnection control section 131 outputs a control signal 135 (refer to FIG. 6) in response to the operation start command 107 from the base station control unit BSC. In addition, the connection/disconnection control section 131 sets up a wireless channel (not shown) to the base station control unit BSC in response to the hand-over execute command 121 from the base station control unit BSC.

The start/stop control section 133 outputs a start signal 137 (refer to FIG. 6) in response to the control signal 135 from the connection/disconnection control section 131 to output the supplementary base station signal 109 to the mobile station MS1.

The constitution of each of the supplementary base stations according to the first embodiment will be described below. Although only the constitution of the supplementary base station SBTS1 is described below, the other supplementary base stations SBTSn have a similar constitution.

Figure 6:
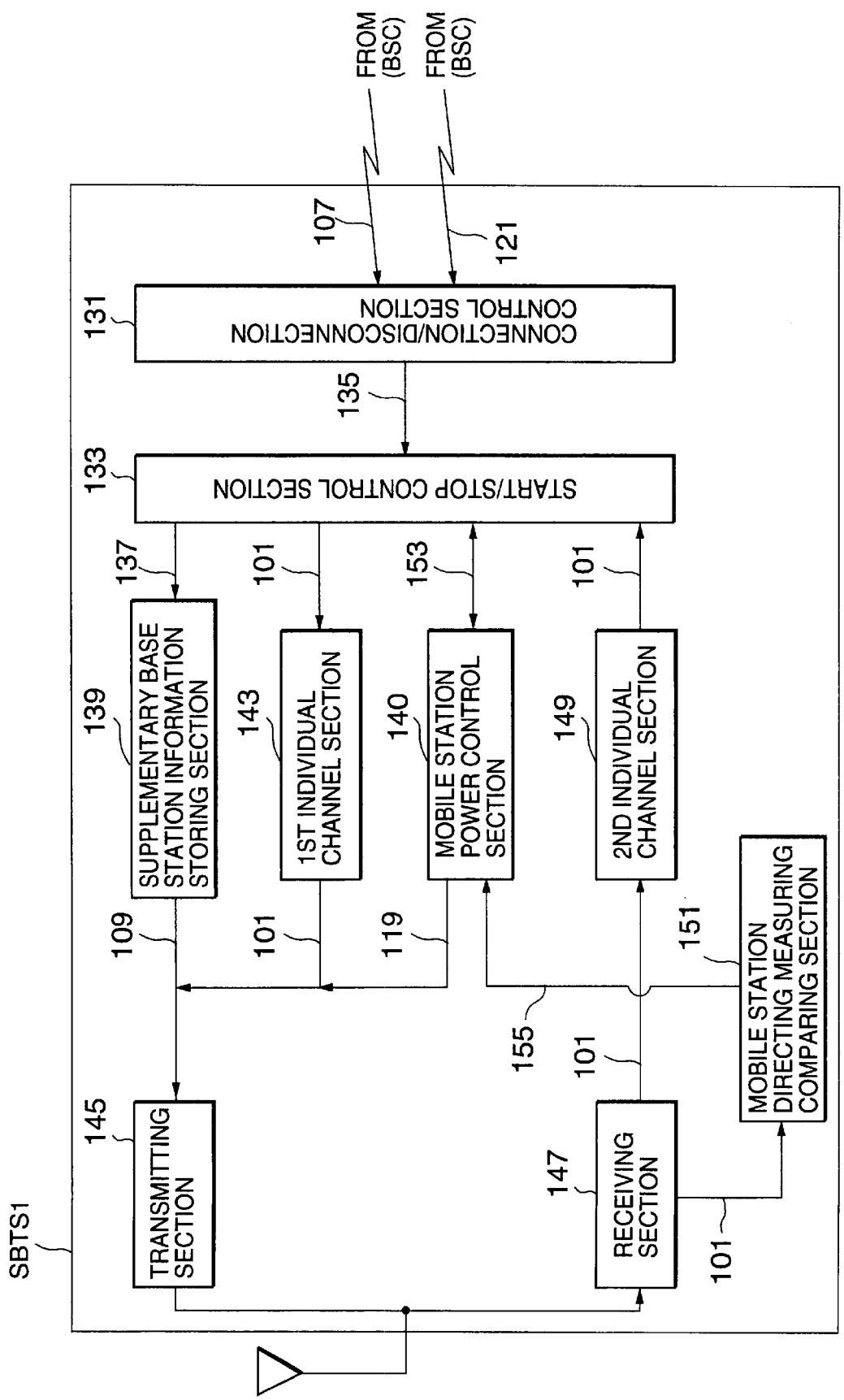
FIG. 6 is a block diagram illustrating the constitution of the supplementary base station shown in FIG. 2.

Referring to FIG. 6, the supplementary base station SBTS1 includes the connection/disconnection control section 131, the start/stop control section 133, a supplementary base station information storing section 139, a mobile station power control section 140, a first individual channel section 143, a transmitting section 145, a receiving section 147, a second individual channel section 149, and a mobile station-directing measuring/comparing section 151.

The connection/disconnection control section 131 outputs the control signal 135 in response to the operation start command 107 from the base station control unit BSC. In addition, the connection/disconnection control section 131 sets up a wireless channel (not shown) to the base station control unit BSC in response to the hand-over execute command 121 from the base station control unit BSC.

The start/stop control section 133 outputs, in response to the control signal 135, the start signal 137 to the supplementary base station information storing section 139 to output the supplementary base station signal 109 (the first identification signal) to the mobile station MS1. The supplementary base station signal 109 contains information for identifying the supplementary base station SBTS1. The start/stop control section 133 further outputs, in response to the control signal 135, a setting command 153 to the mobile station power control section 140 for controlling the up link transmission power of the mobile station MS1. A value indicated by the setting command 153 is a variable value whose setting is periodically changed in the start/stop control section 133. The start/stop control section 133 measures the ratio of signal energy to noise energy in the talk signal or packet signal 101 from the second individual channel section 149, and sets the value of the setting command 153 on the basis of the measured value.

The start/stop control section 133 transfers the talk signal or packet signal 101 from the second individual channel section 149 to the first individual channel section 143. The supplementary base station information storing section 139 outputs the supplementary base station signal 109 in response to the start signal 137 from the start/stop control section 133. The mobile station power control section 140 outputs the mobile station power control signal 119 on the basis of the setting command 153 from the start/stop control section 133 in response to a power change signal 155 from the mobile station-directing measuring/comparing section 151. The mobile station power control signal 119 is a signal in which a command indicative of a change value of the transmission power level of the mobile station MS1 on the up link channel is incorporated.

The transmitting section 145 performs spreading modulation on and outputs the supplementary base station signal 109 from the supplementary base station information storing section 139. In addition, the transmitting section 145 performs spreading modulation on and outputs the mobile station power control signal 119 from the mobile station power control section 140. Furthermore, the transmitting section 145 performs spreading modulation on and outputs the talk signal or packet signal 101 from the first individual channel section 143.

The receiving section 147 receives the talk signal or packet signal 101 from the mobile station MS1 by performing spreading demodulation, and outputs the demodulated talk signal or packet signal 101 to the second individual channel section 149 and to the mobile station-directing measuring/comparing section 151.

The mobile station-directing measuring/comparing section 151 measures the received power level data of the talk signal or packet signal 101 and compares the measured value with a preset threshold value, and outputs a power change signal 155 as the result of the comparison.

The constitution of each of the base stations according to the first embodiment will be described below. Although only the constitution of the base station BTS1 is described below, the other base stations BTSm have a similar constitution.

Figure 7:
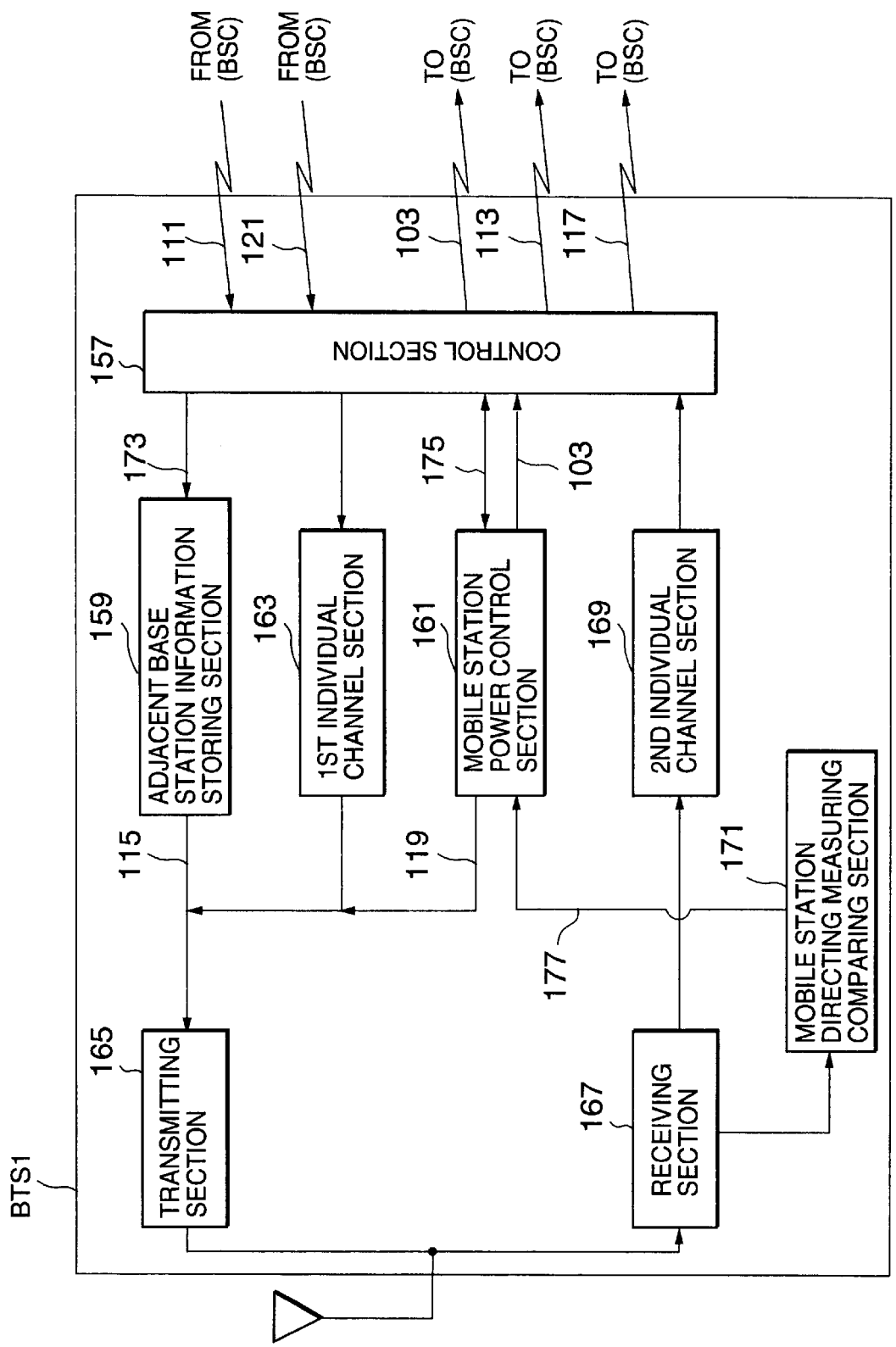
FIG. 7 is a block diagram illustrating the constitution of the base station shown in FIG. 2.

Referring to FIG. 7, the base station BTS1 includes a control section 157, an adjacent base station information storing section 159, a mobile station power control section 161, a first individual channel section 163, a transmitting section 165, a receiving section 167, a second individual channel section 169 and the mobile station-directing measuring/comparing section 171.

The control section 157 is connected to the base station control unit BSC by a wireless channel at all times. The control section 157 outputs the hand-over request signal 103 in response to the hand-over request signal 103 that is outputted from the mobile station power control section 161.

In addition, the control section 157 outputs the adjacent base station measurement result signal 117 and the supplementary base station measurement result signal 113 to the base station control unit BSC in response to these signals 117 and 113 from the second individual channel section 169. The control section 157 further receives the supplementary base station power measurement command 111 and the hand-over execute command 121 from the base station control unit BSC and outputs these commands 111 and 121 to the first individual channel section 163.

The adjacent base station information storing section 159 corresponds to the supplementary base station information storing section 139 described above with reference to FIG. 6. Specifically, the information for identifying the supplementary base station SBTS1 which is stored in the supplementary base station information storing section 139 corresponds to information for identifying a mobile station-associated base station and an adjacent base station. The adjacent base station information storing section 159 outputs the adjacent base station signal 115 in response to a base station control signal 173 from the control section 157.

The mobile station power control section 161 outputs the mobile station power control signal 119 on the basis of a setting command 175 from the control section 157 in response to a power change signal 177 from the mobile station-directing measuring/comparing section 171. The mobile station power control section 161 further receives the hand-over request signal 103 from the mobile station-directing measuring/comparing section 171 and outputs the hand-over request signal 103 to the control section 157. A value indicated by the setting command 175 is a variable value whose setting is periodically changed in the control section 157. The control section 157 measures the ratio of signal energy to noise energy in the talk signal or packet signal 101 from the second individual channel section 169, and determines the value of the setting command 175 on the basis of the measured value.

The transmitting section 165 performs spreading modulation on and outputs the talk signal or packet signal 101 from the first individual channel section 163. In addition, the transmitting section 165 performs spreading modulation on the supplementary base station power measurement command 111 and outputs the modulated command 111 to the mobile station MS1. Furthermore, the transmitting section 165 performs spreading modulation on the hand-over execute command 121 and outputs the modulated command 121 to the mobile station MS1.

The receiving section 167 receives the talk signal or packet signal 101 from the mobile station MS1 by performing spreading demodulation, and outputs the demodulated talk signal or packet signal 101 to the second individual channel section 169 and to the mobile station-directing measuring/comparing section 171. In addition, the receiving section 167 receives the adjacent base station measurement result signal 117 and the supplementary base station measurement result signal 113 from the mobile station MS1 by performing spreading demodulation, and outputs the demodulated signals 117 and 113 to the second individual channel section 169.

The mobile station-directing measuring/comparing section 171 measures the received power level data of the talk signal or packet signal 101 from the receiving section 167 and compares the measured result with a preset threshold value (a first threshold value), and outputs a power change signal 177 to the mobile station power control section 161 as the result of the comparison.

The mobile station-directing measuring/comparing section 171 selectively outputs the hand-over request signal 103 on the basis of the received power level data of the talk signal or packet signal 101. The hand-over request signal 103 is a signal for requesting the base station control unit BSC to execute a hand-over to a supplementary base station adjacent to the base station BTS1 if the received power level data of the talk signal or packet signal 101 is lower than the preset threshold value (the first threshold value).

A service area supplementing method for the CDMA mobile communication system according to the first embodiment will be described below. It is assumed that the mobile station MS1 is located in the vicinity of the service area (cell) to be covered by the base station BTS1, as shown in FIG. 2, and moves in the direction of the base station BTS2.

The mobile station MS1 is performing not a soft hand-over which is generally executed in the CDMA mobile communication system but communication with the base station BTS1 which is a mobile station-associated base station. During the soft hand-over, the operation of the mobile station MS1 is the same.

Figure 8:
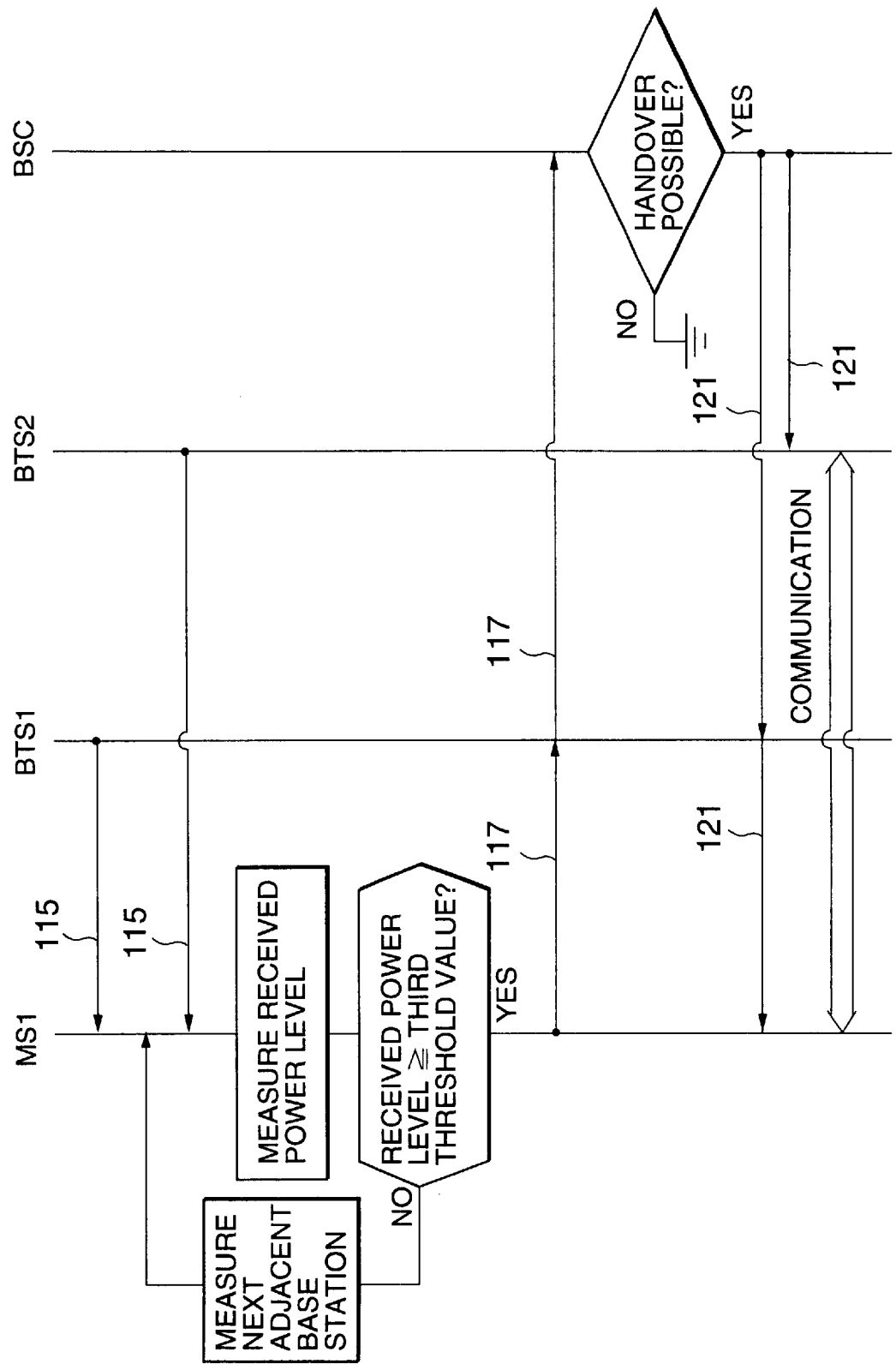
FIG. 8 is a view illustrating a part of the operation of the CDMA mobile communication system according to the first embodiment of the present invention.

Referring to FIG. 8, the mobile station MS1 receives the adjacent base station signal 115 from the base station BTS1 which is a mobile station-associated base station. As described previously, the adjacent base station signal 115 has information for identifying each of the adjacent base stations (only the base station BTS2 is shown in FIG. 2). The mobile station MS1 receives the adjacent base station signal 115 from the base station BTS2 which is an adjacent base station, by performing spreading demodulation using information of the adjacent base station signal 115, and measures the received power level data of the adjacent base station signal 115.

The mobile station MS1 compares the measured value of the received power level data with a preset threshold value (a third threshold value) by means of the station-directing measuring/comparing section 185. The mobile station MS1 transmits an adjacent base station which gives received power level data which is not lower than the third threshold value (only the base station BTS2 is shown in FIG. 8) and the received power level data to the base station control unit BSC via the base station BTS1 as the adjacent base station measurement result signal 117. As described previously, the mobile station MS1 periodically executes the above-described measurement and comparison by the station-directing measuring/comparing section 185.

The base station control unit BSC determines that a hand-over by the base station BTS2 is to be executed, in response to the adjacent base station measurement result signal 117 from the base station BTS1, and outputs the hand-over execute command 121 to the base station BTS1 and to the base station BTS2 which is a base station adjacent to the base station BTS1, as well as to the mobile station MS1 via the base station BTS1.

FIGS. 9A and 9B show the received power level data of the talk signal or packet signal 101 at each of the base station BTS1 and the base station BTS2 and the received power level data of the adjacent base station signal 115 at the mobile station MS1 in the process of the above-described operation processing. These received power level data indicate values which are obtained when a cell reduction is not occurring.

FIG. 9A shows that if the received power level data of the talk signal or packet signal 101 is compared with the first threshold value, each of the received power level data of the talk signal or packet signal 101 from the base station BTS1 and the received power level data of the talk signal or packet signal 101 from the base station BTS2 exceeds the first threshold value.

FIG. 9B shows that at the current location of the mobile station MS1, a hand-over by the base station BTS2 is possible because the received power level data of the adjacent base station signal 115 from the base station BTS2 is not lower than the third threshold value.

On the other hand, if a reduction of the cell occurs in the service area to be covered by the base station BTS1 which is a mobile station-associated base station, the mobile station MS1 measures the received power level data of the adjacent base station signal 115 from the adjacent base station (only the base station BTS2 is shown in FIG. 2). In this case, an adjacent base station which gives received power level data higher than the third threshold value does not exist. For this reason, a conventional soft hand-over is difficult to execute.

As the mobile station MS1 moves closer to the boundary of the service area in the direction of the base station BTS2, the quality of the talk signal or packet signal 101 to be received becomes lower. During this time, the mobile station MS1 attempts to maintain the quality by increasing its transmission power up to the maximum transmission power, but after the transmission power reaches the maximum transmission power, the quality of speech becomes difficult to maintain.

FIGS. 9C and 9D show the received power level data of the talk signal or packet signal 101 at each of the base station BTS1 and the base station BTS2 and the received power level data of the adjacent base station signal 115 at the mobile station MS1 in a situation in which a cell reduction is occurring. As shown in FIG. 9C, as the first threshold value rises by interference from another mobile station on an up link channel due to an increase in the number of mobile stations, the received power level data of the talk signal or packet signal 101 at each of the base station BTS1 and the base station BTS2 becomes lower.

At each of the base station BTS1 and the base station BTS2, the accuracy of detection of the talk signal or packet signal 101 from the mobile station MS1 is low until the mobile station MS1 reaches a location indicated by the associated one of the dashed lines shown in FIG. 9C (the parallel movement of the mobile station MS1 is taken into account).

Figure 10:
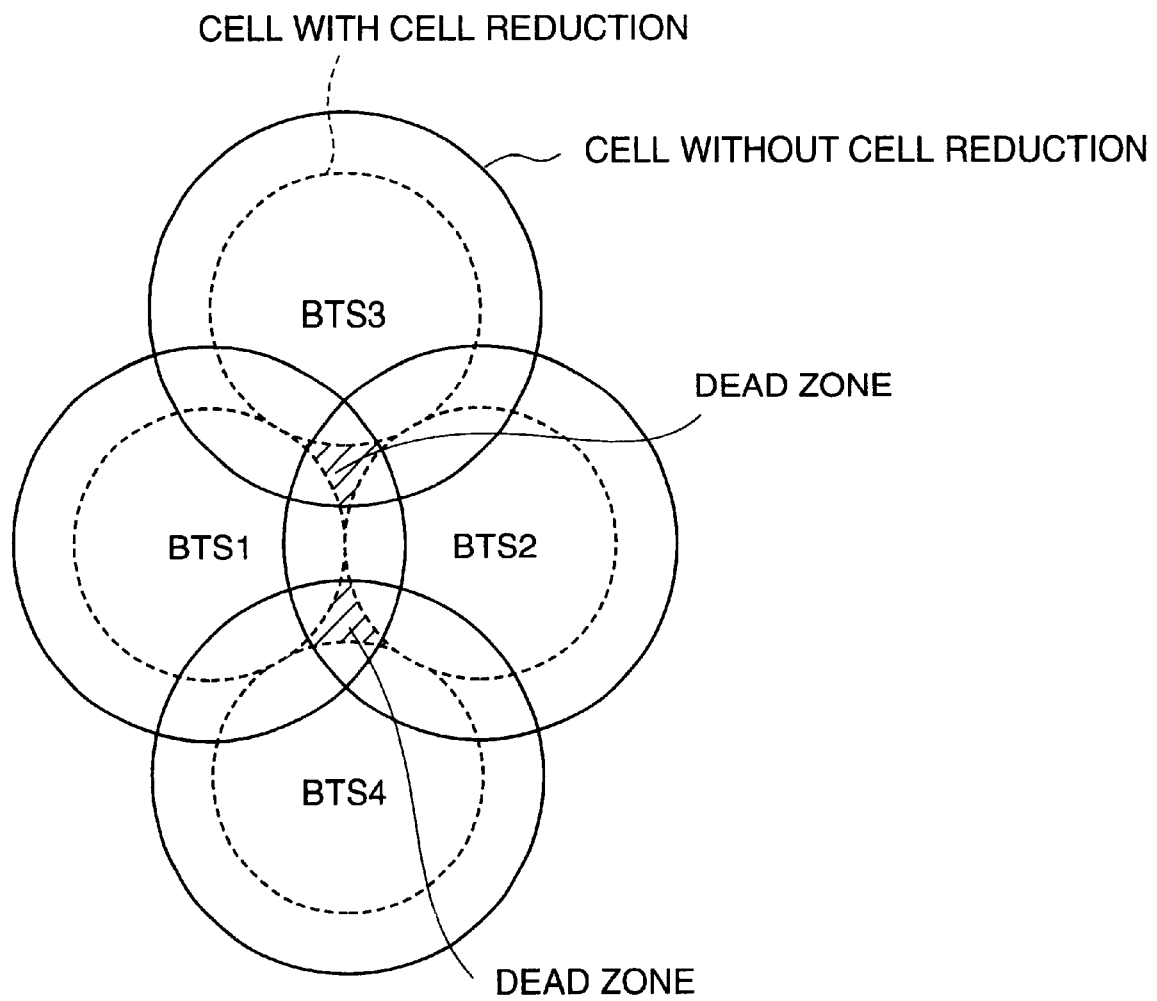
FIG. 10 is a view illustrating dead zones which occur during a cell reduction.

The phenomenon of a cell reduction will be described below with reference to FIG. 10. The station arrangement shown in FIG. 10 corresponds to the arrangement of the base stations shown in FIG. 3. As shown in FIG. 10, if cell reductions simultaneously occur at the service areas to be covered by the respective four base stations BTS1 to BTS4, dead zones (hatched regions) occur between adjacent cells. The supplementary base station SBTS1 shown in FIG. 2 is temporarily operated to cope with the dead zones which occur suddenly.

The operation of the CDMA mobile communication system at the time of occurrence of a cell reduction will be described below with reference to FIG. 11. The base station BTS1 which is a mobile station-associated base station selectively outputs the hand-over request signal 103 on the basis of the received power level data of the talk signal or packet signal 101 from the mobile station MS1. Specifically, the base station BTS1 receives the talk signal or packet signal 101 by performing spreading demodulation, and measures the received power level data of the talk signal or packet signal 101 and compares the measured result with the preset first threshold value. If the received power level data of the talk signal or packet signal 101 is lower than the first threshold value, the base station BTS1 recognizes a cell reduction and outputs the hand-over request signal 103 to the base station control unit BSC.

Figure 11:
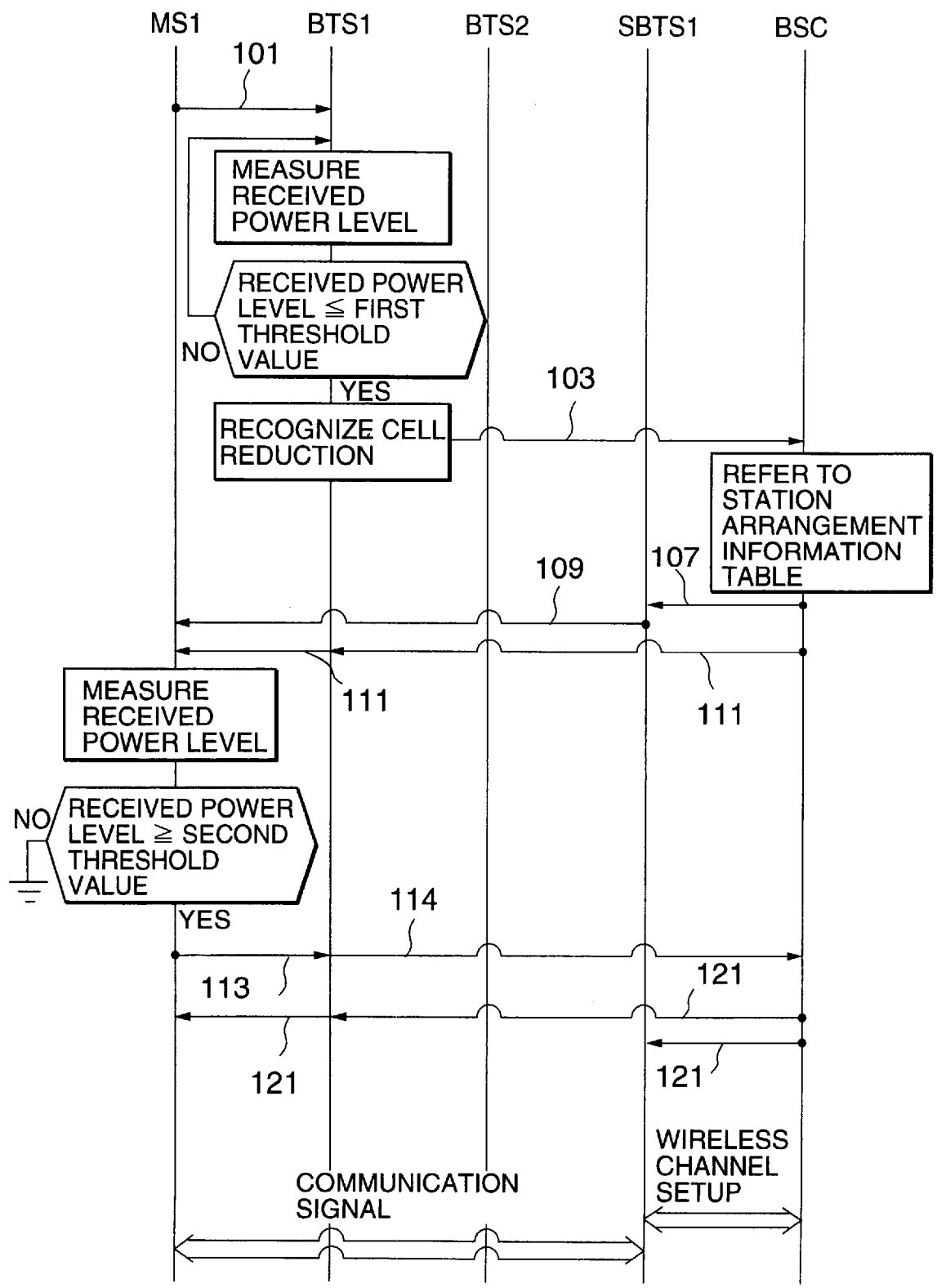
FIG. 11 is a view illustrating a service area supplementing method for the CDMA mobile communication system according to the first embodiment of the present invention.

The base station control unit BSC outputs, in response to the hand-over request signal 103, the operation start command 107 which commands a selected supplementary base station (only the supplementary base station SBTS1 is shown in FIGS. 2 and 11) to start an operation. Specifically, the base station control unit BSC refers to the station arrangement information table 105 (FIG. 4) in response to the hand-over request signal 103 and select, as targets to be operated, all supplementary base stations adjacent to the base station BTS1 which is the mobile station-associated base station which has transmitted the hand-over request signal 103. Then, the base station control unit BSC outputs the operation start command 107 to each of the selected supplementary base stations. Incidentally, although only the supplementary base station SBTS1 is shown in FIG. 2, FIG. 3 shows the supplementary base station SBTS2 in addition to the supplementary base station SBTS1.

Then, a hand-over by the selected supplementary base station SBTS1 is executed in response to the operation start command 107 from the base station control unit BSC on the basis of the received power level data of the supplementary base station signal 109 (the first identification signal). During this operation, the supplementary base station SBTS1 outputs the supplementary base station signal 109 in response to the operation start command 107 from the base station control unit BSC. Then, when the supplementary base station signal 109 is outputted from the supplementary base station SBTS1, the base station control unit BSC outputs the supplementary base station power measurement command 111 to the mobile station MS1 via the base station BTS1. On the basis of the supplementary base station power measurement command 111, the mobile station MS1 receives the supplementary base station signal 109 by performing spreading demodulation, and measures the received power level data of the supplementary base station signal 109 and compares the received power level data of the supplementary base station signal 109 with the second threshold value.

If the received power level data of the supplementary base station signal 109 is not lower than the second threshold value, the mobile station MS1 outputs the supplementary base station measurement result signal 113 to the base station control unit BSC via the base station BTS1. The received power level data of the supplementary base station signal 109 measured at the mobile station MS1 becomes a value which is not lower than the second threshold value. The reason for this is that the above-described dead zones (FIG. 10) are temporarily set as cover areas, although the value of the received power level data depends on the number of channels of the supplementary base station.

The base station control unit BSC outputs, in response to the supplementary base station measurement result signal 113 from the base station BTS1, the hand-over execute command 121 to the base station BTS1 and to the selected supplementary base station SBTS1, as well as to the mobile station MS1 via the base station BTS1.

The supplementary base station SBTS1 sets up a wireless channel to the base station control unit BSC in response to the hand-over execute command 121, and executes a hand-over from the base station BTS1 which is a mobile station-associated base station.

Figure 12:
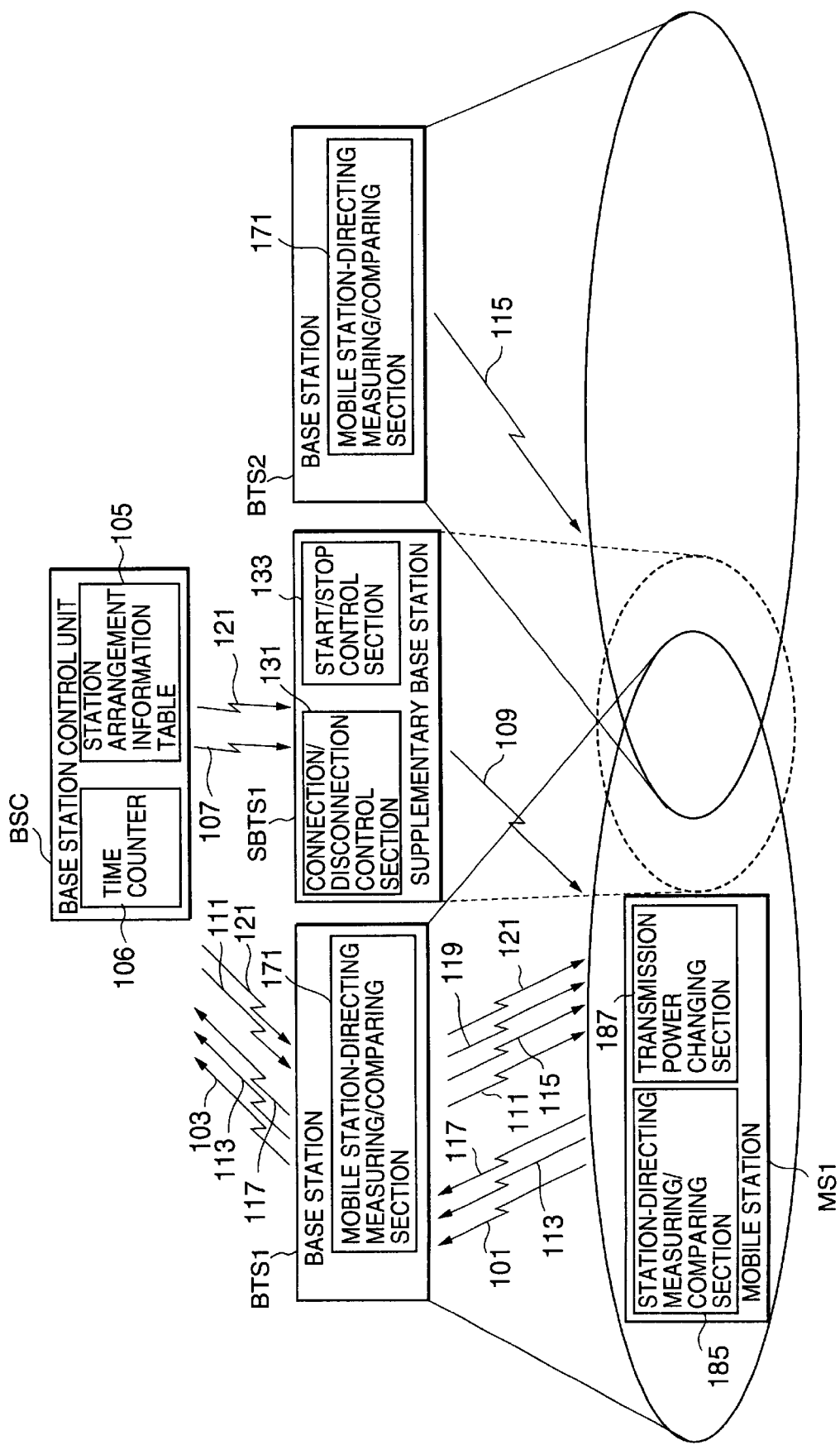
FIG. 12 is a view illustrating the constitution of a CDMA mobile communication system according to a second embodiment of the present invention.

A CDMA mobile communication system according to a second embodiment of the present invention will be described below with reference to FIGS. 12 to 14. In FIG. 12, the constitution of the CDMA mobile communication system according to the second embodiment is identical to the constitution of the first embodiment except that the base station control unit BSC is provided with a time counter 106. Accordingly, in FIG. 12, identical reference numerals are used to denote portions (constituent elements and signals) identical to those used in the first embodiment, and the description of the same portions is omitted.

In the first embodiment, if a cell reduction occurs, the base station control unit BSC selects, as targets to be operated, all supplementary base stations which are adjacent to the base station BTS1 (which is a mobile station-associated base station) with respect to a service area. Incidentally, FIG. 2 shows only the supplementary base station SBTS1 for the convenience of description.

The second embodiment has the feature of selecting one supplementary base station from among supplementary base stations which are adjacent to a mobile station-associated base station with respect to a service area, and operating the selected supplementary base station. The time counter 106 is for counting, within a preset waiting time, a time period which elapses until the supplementary base station measurement result signal 113 outputted from the mobile station MS1 is received.

Incidentally, the constitution of each base station BTSm (m is an integer of not less than 1, and only the base station BTS1 and the base station BTS2 are shown in FIG. 12) and the constitution of each supplementary base station SBTSn (n is an integer of not less than 1, and only the supplementary base station SBTS1 is shown in FIG. 12) are identical to those described previously in connection with the first embodiment.

A service area supplementing method for the CDMA mobile communication system according to the second embodiment will be described below. In the following description, it is assumed that received power level data such as those shown in FIGS. 9C and 9D are detected at the base station BTS1 which is a mobile station-associated base station, the base station BTS2 which is an adjacent base station, and the mobile station MS1.

Figure 13:
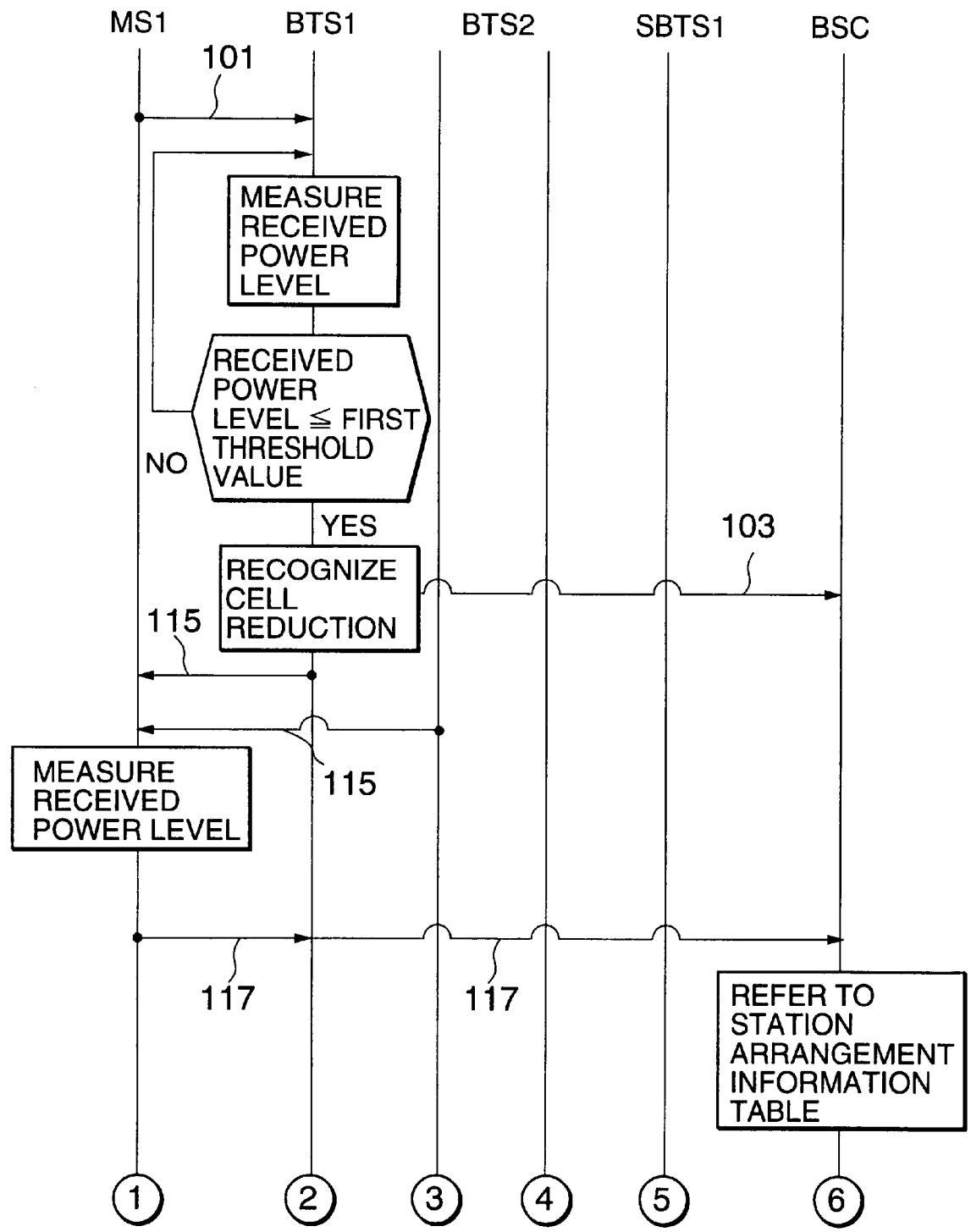
FIG. 13 is a view illustrating a part of a service area supplementing method for the CDMA mobile communication system according to the second embodiment of the present invention.

Referring to FIG. 13, the base station BTS1 responds to the talk signal or packet signal 101 from the mobile station MS1 by performing spreading demodulation, and selectively outputs the hand-over request signal 103 on the basis of the received power level data of the talk signal or packet signal 101. The above operation is identical to that of the first embodiment.

In the second embodiment, the following two operations are selectively executed. The first operation is to output the hand-over execute command 121 to a selected supplementary base station in response to the hand-over request signal 103 according to the waiting time which elapses until the reception of the supplementary base station measurement result signal 113 which is selectively outputted from the mobile station MS1 on the basis of the received power level data of the supplementary base station signal 109. Incidentally, the supplementary base station signal 109 has information for identifying the selected supplementary base station (the present supplementary base station). The second operation is to select a new supplementary base station to which to hand-over a call (the next supplementary base station) and output the hand-over execute command 121 to the newly selected supplementary base station.

The above operations follow procedures which will be described below. The base station control unit BSC receives, in response to the hand-over request signal 103, the adjacent base station measurement result signal 117 from the mobile station MS1 via the base station BTS1. The base station control unit BSC further refers to the station arrangement information table 105 and selects a supplementary base station (the supplementary base station SBTS1 shown in FIGS. 12 and 13) which is arranged between the base station BTS1 and an adjacent base station which gives the highest received power level data (the base station BTS2 shown in FIGS. 12 and 13), on the basis of the adjacent base station measurement result signal 117 which is selectively outputted from the mobile station MS1 on the basis of the received power level data of the adjacent base station signal 115 which corresponds to each adjacent base station (a second identification signal), and then the base station control unit BSC outputs the operation start command 107.

The adjacent base station measurement result signal 117 is a signal which informs the base station control unit BSC of an adjacent base station which gives the received power level data of the adjacent base station signal 115 and of the received power level data if the mobile station MS1 compares the received power level data of the adjacent base station signal 115 with a preset third threshold value and determines that the received power level data of the adjacent base station signal 115 is not lower than the third threshold value.

Figure 14:
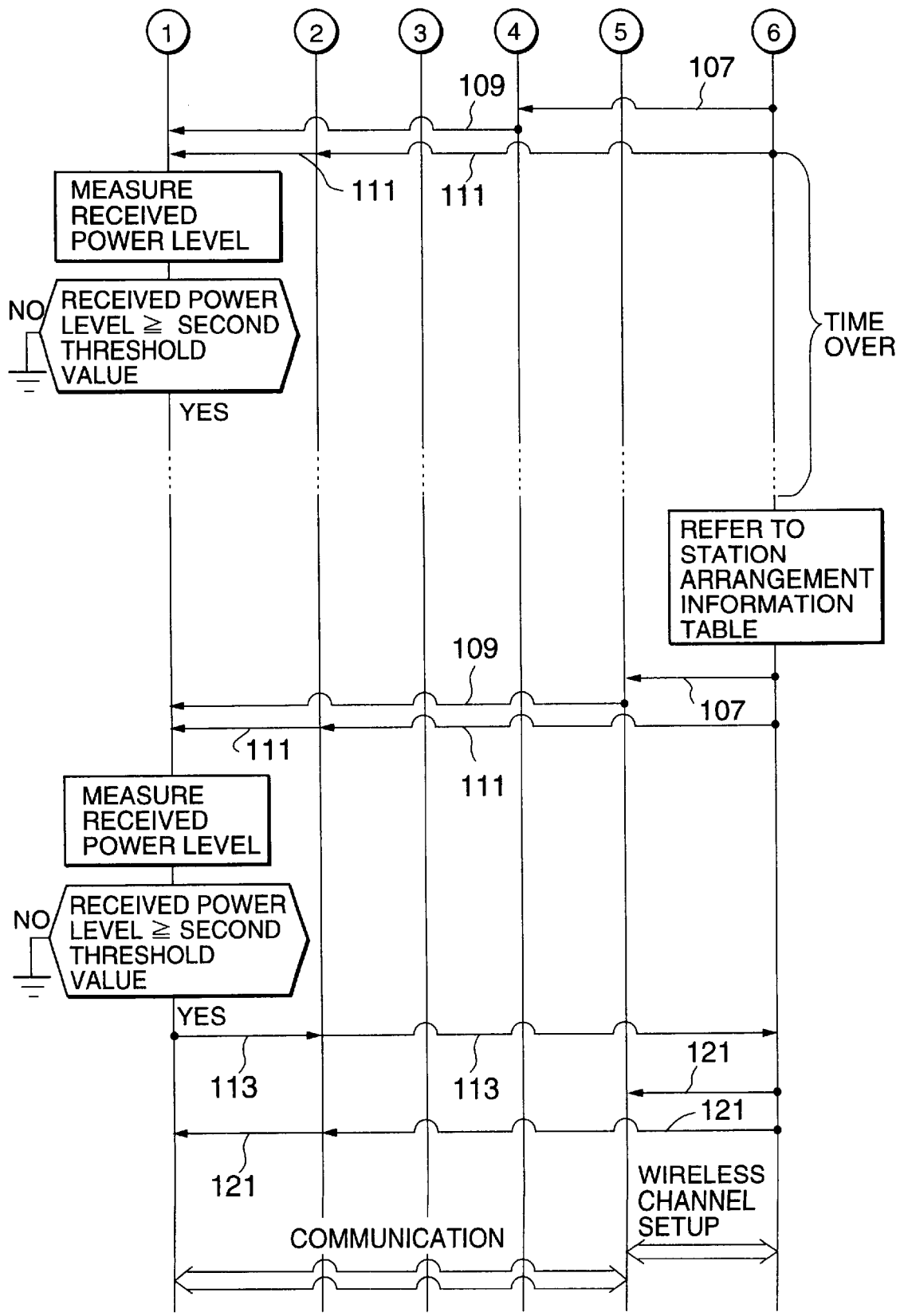
FIG. 14 is a view illustrating the other part of the service area supplementing method for the CDMA mobile communication system according to the second embodiment of the present invention.

Referring to FIG. 14, the selected supplementary base station SBTS1 outputs the supplementary base station signal 109 (the first identification signal) in response to the operation start command 107 from the base station control unit BSC. If the supplementary base station signal 109 is outputted from the supplementary base station SBTS1, the base station control unit BSC outputs the supplementary base station power measurement command 111 to the mobile station MS1 via the base station BTS1.

The mobile station MS1 receives the supplementary base station signal 109 by performing spreading demodulation, on the basis of the supplementary base station power measurement command 111, and selectively outputs the supplementary base station measurement result signal 113 to the base station control unit BSC via the base station BTS1 on the basis of the received power level data of the supplementary base station signal 109.

The base station control unit BSC counts within a preset waiting time by means of the time counter 106 a time period which elapses from a time instant when the supplementary base station power measurement command 111 is outputted until the base station control unit BSC receives the supplementary base station measurement result signal 113.

If the base station control unit BSC receives within the preset waiting time the supplementary base station measurement result signal 113 relative to the supplementary base station SBTS1, the base station control unit BSC outputs the hand-over execute command 121 to the base station BTS1 and to the supplementary base station SBTS1, as well as to the mobile station MS1 via the base station BTS1.

The supplementary base station SBTS1 sets up a wireless channel to the base station control unit BSC in response to the hand-over execute command 121, and executes a hand-over from the base station BTS1. FIG. 14 does not show the process in which the base station control unit BSC receives the supplementary base station measurement result signal 113 relative to the supplementary base station SBTS1 and then the hand-over is executed by the supplementary base station SBTS1.

If the base station control unit BSC does not receive the supplementary base station measurement result signal 113 relative to the supplementary base station SBTS1 within the preset waiting time, the base station control unit BSC again refers to the station arrangement information table 105 on the basis of the adjacent base station measurement result signal 117 (not shown in FIG. 14) and selects a supplementary base station (which is not shown in FIG. 12 but is shown as the supplementary base station SBTS2 in FIGS. 13 and 14) which is arranged between the base station BTS1 and an adjacent base station (which is not shown in FIG. 12 or 13) which gives the second highest received power level data. The thus-selected supplementary base station is set as the next supplementary base station.

The adjacent base station measurement result signal 117 for selecting the supplementary base station SBTS2 (the next supplementary base station) may be obtained by storing as data the adjacent base station measurement result signal 117 used to select the supplementary base station SBTS1 (the present supplementary base station) and reusing the stored data, or by receiving a new adjacent base station measurement result signal 117 via the base station BTS1.

The base station control unit BSC outputs the operation start command 107 to the newly selected supplementary base station SBTS2, and when the supplementary base station SBTS2 outputs the supplementary base station signal 109, the base station control unit BSC outputs the supplementary base station power measurement command 111 to the mobile station MS1 via the base station BTS1. In addition, the base station control unit BSC counts within the preset waiting time a time period which elapses from a time instant when the supplementary base station power measurement command 111 is outputted until the base station control unit BSC receives the supplementary base station measurement result signal 113 from the mobile station MS1.

If the base station control unit BSC receives the supplementary base station measurement result signal 113 relative to the supplementary base station SBTS2 from the mobile station MS1 within the preset waiting time, the base station control unit BSC outputs the hand-over execute command 121 to the base station BTS1 and to the supplementary base station SBTS2, as well as to the mobile station MS1 via the base station BTS1.

The supplementary base station SBTS2 sets up a wireless channel to the base station control unit BSC in response to the hand-over execute command 121, and executes a hand-over from the base station BTS1.

In the second embodiment, although the time at which the supplementary base station power measurement command 111 is outputted is used as the reference time at which the time counter 106 starts counting, the time at which another command is outputted may also be used as such reference time. The operation start command 107 which has a fixed temporal relation to the supplementary base station power measurement command 111 can be used as another command.

Figure 15:
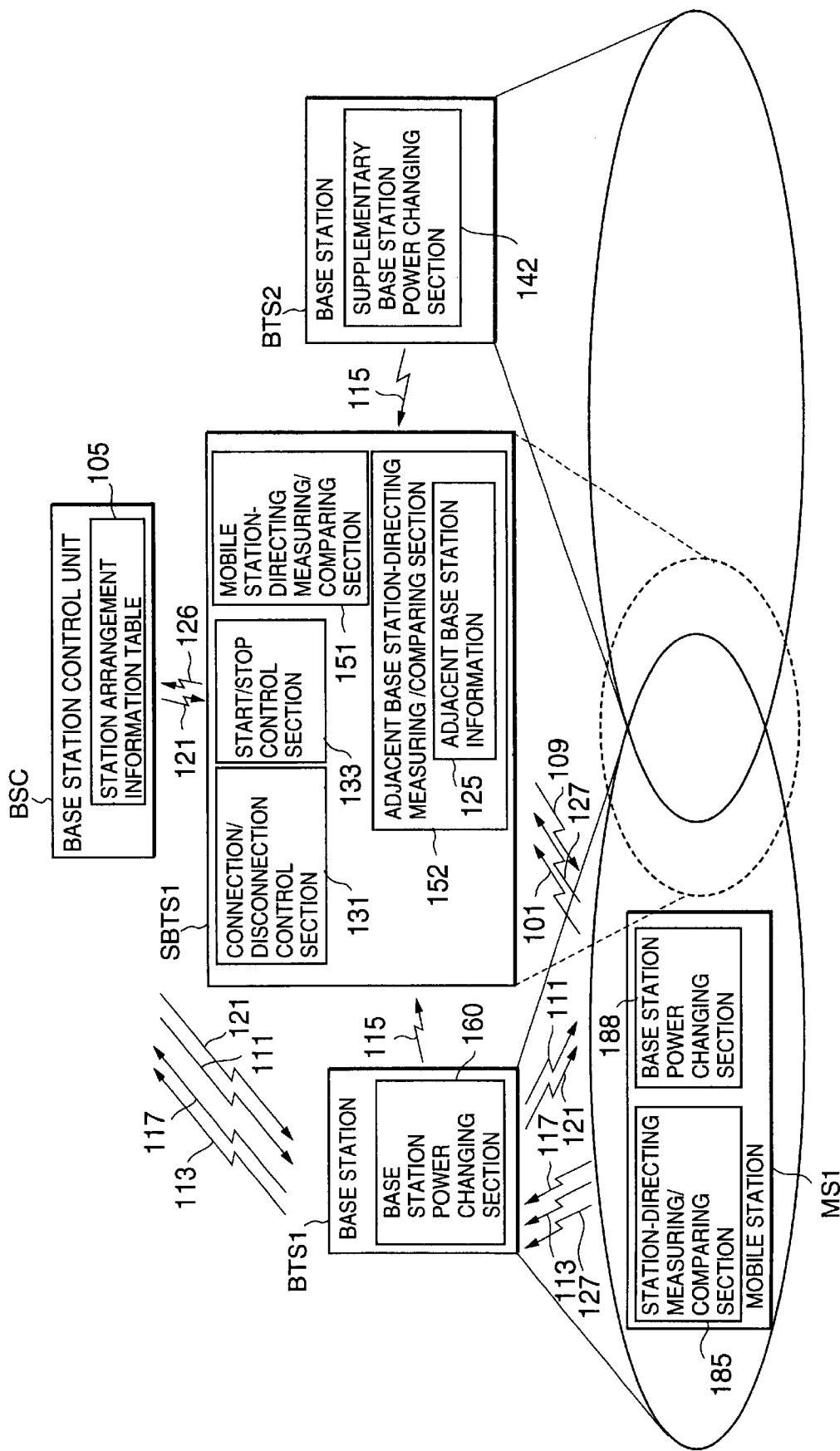
FIG. 15 is a view illustrating the constitution of a CDMA mobile communication system according to a third embodiment of the present invention.

A CDMA mobile communication system according to a third embodiment of the present invention will be described below with reference to FIGS. 15 to 19. Referring to FIG. 15, similarly to the first embodiment, the CDMA mobile communication system includes a mobile station MSr (only the mobile station MS1 is shown in FIG. 15), a base station BTSm (only the base station BTS1 and the base station BTS2 are shown in FIG. 15) to be connected to the mobile station MSr by a wireless channel, a supplementary base station SBTSn (only the supplementary base station SBTS1 is shown in FIG. 15) to be connected to the mobile station MSr by a wireless channel during a reduction of a cell, and a base station control unit BSC to be connected to the base station BTSm and the supplementary base station SBTSn by a wireless channel. In FIG. 15, identical reference numerals are used to denote portions (constituent elements and signals) identical to those used in the first embodiment, and the description of the same portions is omitted.

The supplementary base station SBTS1 includes the mobile station-directing measuring/comparing section 151, an adjacent base station-directing measuring/comparing section 152, the connection/disconnection control section 131 and the start/stop control section 133. The mobile station-directing measuring/comparing section 151 selectively outputs a first comparison signal 123 (refer to FIG. 16) in response to the talk signal or packet signal 101 from the mobile station MS1 on the basis of the received power level data of the talk signal or packet signal 101.

The adjacent base station-directing measuring/comparing section 152 selectively outputs a second comparison signal 124 (refer to FIG. 16) on the basis of the received power level data of the adjacent base station signal 115 in response to the adjacent base station signal 115 (the second identification signal) outputted from an adjacent base station (only the base station BTS2 is shown in FIG. 15) on the basis of adjacent base station information 125. The adjacent base station information 125 is information which is preset to identify the base station BTS2 which is an adjacent base station, and will be described later in detail.

The start/stop control section 133 outputs an operation informing signal 126 in response to the first comparison signal 123 and the second comparison signal 124, and also outputs the start signal 137 (refer to FIG. 16) to output the supplementary base station signal 109 (the first identification signal) to the mobile station MS1. The operation informing signal 126 is a signal for informing the base station control unit BSC that the supplementary base station SBTS1 has started an operation.

The connection/disconnection control section 131 outputs the operation informing signal 126 from the start/stop control section 133 to the base station control unit BSC. In addition, the connection/disconnection control section 131 sets up a wireless channel to the base station control unit BSC in response to the hand-over execute command 121 from the base station control unit BSC.

In the third embodiment, a supplementary base station to be temporarily operated during a cell reduction (only the supplementary base station SBTS1 is shown in FIG. 15) is a supplementary base station (refer to FIG. 3) which is adjacent to a mobile station-associated base station with respect to a service area.

The base station control unit BSC outputs the supplementary base station power measurement command 111 to the mobile station MS1 via the base station BTS1 which is a mobile station-associated base station, in response to the operation informing signal 126 from the supplementary base station SBTS1.

The mobile station MS1 selectively outputs the supplementary base station measurement result signal 113 to the base station control unit BSC via the base station BTS1 on the basis of the received power level data of the supplementary base station signal 109 in response to the supplementary base station signal 109 on the basis of the supplementary base station power measurement command 111. In the mobile station MS1, the station-directing measuring/comparing section 185 measures the received power level data of the supplementary base station signal 109 and compares the received power level data with a present threshold value (a second threshold value). If the comparison shows that the received power level data of the supplementary base station signal 109 is not lower than the second threshold value, the station-directing measuring/comparing section 185 outputs the supplementary base station measurement result signal 113.

Furthermore, in the mobile station MS1, the station-directing measuring/comparing section 185 receives a talk signal or packet signal (not shown) by performing spreading demodulation on a down link channel from the base station BTS1, and measures the received power level data of the talk signal or packet signal and compares the received power level data with a predetermined threshold value. On the basis of the result of the comparison made by the station-directing measuring/comparing section 185, a base station power control section 188 outputs a base station power control signal 127 in which a command indicative of change values of the transmission power levels of the base station BTS1 and the supplementary base station SBTS1 is incorporated.

In response to the supplementary base station measurement result signal 113, the base station control unit BSC outputs the hand-over execute command 121 to the base station BTS1 and to the supplementary base station SBTS1, as well as to the mobile station MS1 via the base station BTS1.

Figure 16:
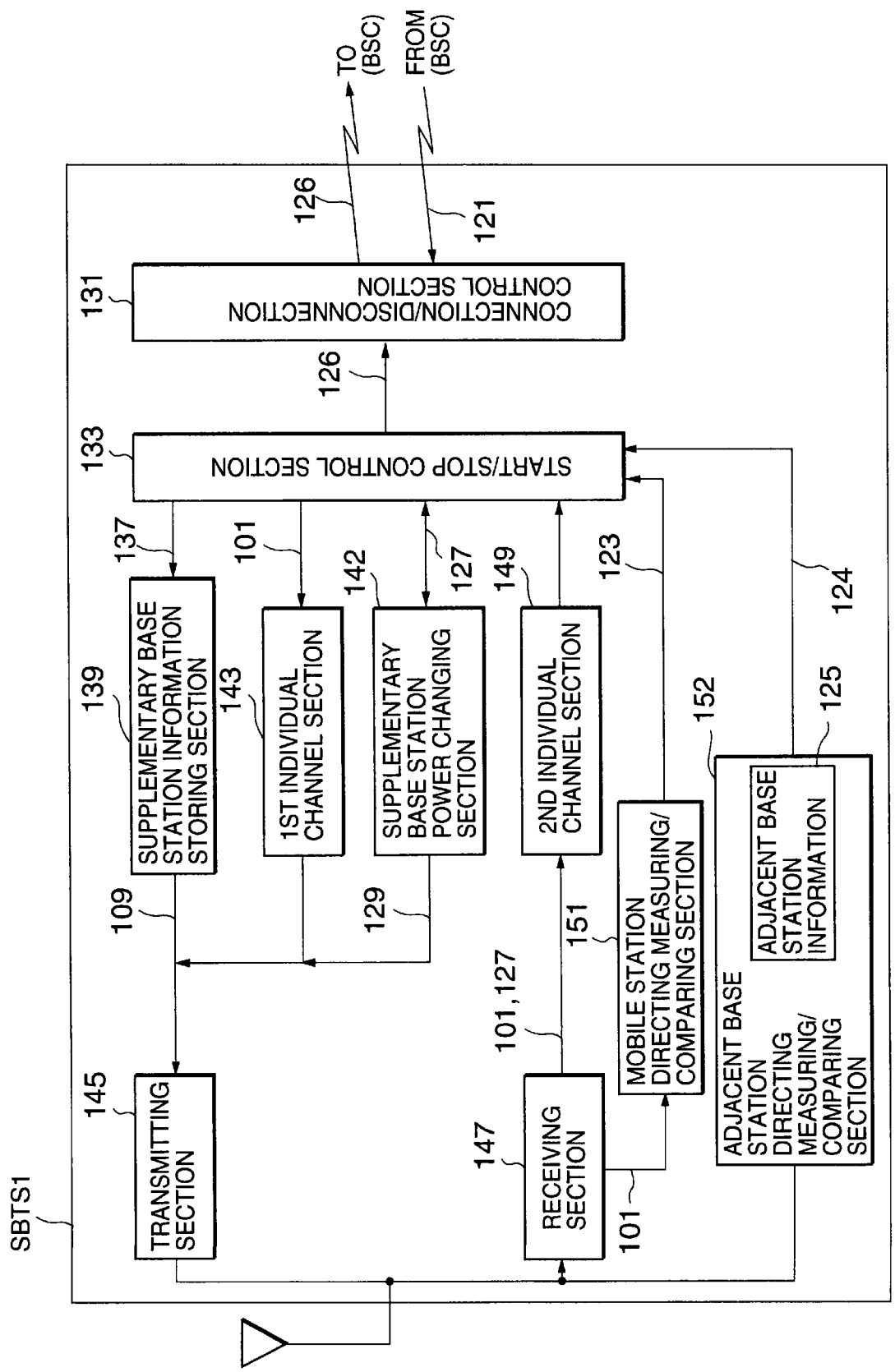
FIG. 16 is a block diagram illustrating the constitution of the supplementary base station shown in FIG. 15.

The constitution of each of the supplementary base stations according to the third embodiment will be described below with reference to FIG. 16. Although only the constitution of the supplementary base station SBTS1 is described below, the other supplementary base stations SBTSn have a similar constitution. Referring to FIG. 16, the supplementary base station SBTS1 includes the connection/disconnection control section 131, the start/stop control section 133, the supplementary base station information storing section 139, a supplementary base station power changing section 142, the first individual channel section 143, the transmitting section 145, the receiving section 147, the second individual channel section 149, the mobile station-directing measuring/comparing section 151, and the adjacent base station-directing measuring/comparing section 152.

The mobile station-directing measuring/comparing section 151 selectively outputs the first comparison signal 123 as a comparison result on the basis of the received power level data of the talk signal or packet signal 101 from the receiving section 147.

The adjacent base station-directing measuring/comparing section 152 is provided with a receiving function, a power measuring function, and the function of comparing a measured value with a threshold value. The adjacent base station-directing measuring/comparing section 152 receives the adjacent base station signal 115 (refer to FIG. 15) by performing spreading demodulation, on the basis of the preset adjacent base station information 125, and selectively outputs the second comparison signal 124 as a comparison result on the basis of the received power level data of the adjacent base station signal 115. The adjacent base station information 125 is information required to execute a part of the operation of the mobile station MS1 which has been described previously in connection with each of the first and the second embodiments, in place of the mobile station MS1. The part of the operation of the mobile station MS1 includes the operation of measuring the received power level data of the adjacent base station signal 115 and the operation of comparing the received power level data with a third threshold value by the mobile station MS1. In the third embodiment, the part of the operation of the mobile station MS1 is executed by the supplementary base station in place of the mobile station MS1 (the supplementary base station SBTS1 shown in FIG. 15). The adjacent base station information 125 is composed of information on a cell to be covered by each adjacent base station and a spreading code for identifying each adjacent base station, as described with reference to FIG. 5.

The connection/disconnection control section 131 outputs the operation informing signal 126 from the start/stop control section 133 to the base station control unit BSC. In addition, the connection/disconnection control section 131 sets up a wireless channel to the base station control unit BSC in response to the hand-over execute command 121 from the base station control unit BSC.

The start/stop control section 133 outputs the operation informing signal 126 in response to the first comparison signal 123 and the second comparison signal 124. In addition, the start/stop control section 133 outputs the start signal 137 to the supplementary base station information storing section 139 to output the supplementary base station signal 109 (the first identification signal) from the supplementary base station information storing section 139. The start/stop control section 133 further outputs the base station power control signal 127 from the second individual channel section 149 to the supplementary base station power changing section 142, and transfers the talk signal or packet signal 101 from the second individual channel section 149 to the first individual channel section 143.

The supplementary base station power changing section 142 decodes a power change command incorporated in the base station power control signal 127 and outputs the decoded result to the transmitting section 145 as a power change value signal 129 indicative of a power change value of transmission power.

The transmitting section 145 performs spreading modulation on and outputs the supplementary base station signal 109 on the basis of the power change value signal 129 from the supplementary base station power changing section 142. In addition, the transmitting section 145 performs spreading modulation on and outputs the talk signal or packet signal 101 from the first individual channel section 143.

The receiving section 147 receives the talk signal or packet signal 101 by performing spreading demodulation, and outputs the demodulated talk signal or packet signal 101 to the second individual channel section 149 and to the mobile station-directing measuring/comparing section 151. In addition, the receiving section 147 receives the base station power control signal 127 from the mobile station MS1 by performing spreading demodulation, and outputs the demodulated base station power control signal 127 to the second individual channel section 149.

Figure 17:
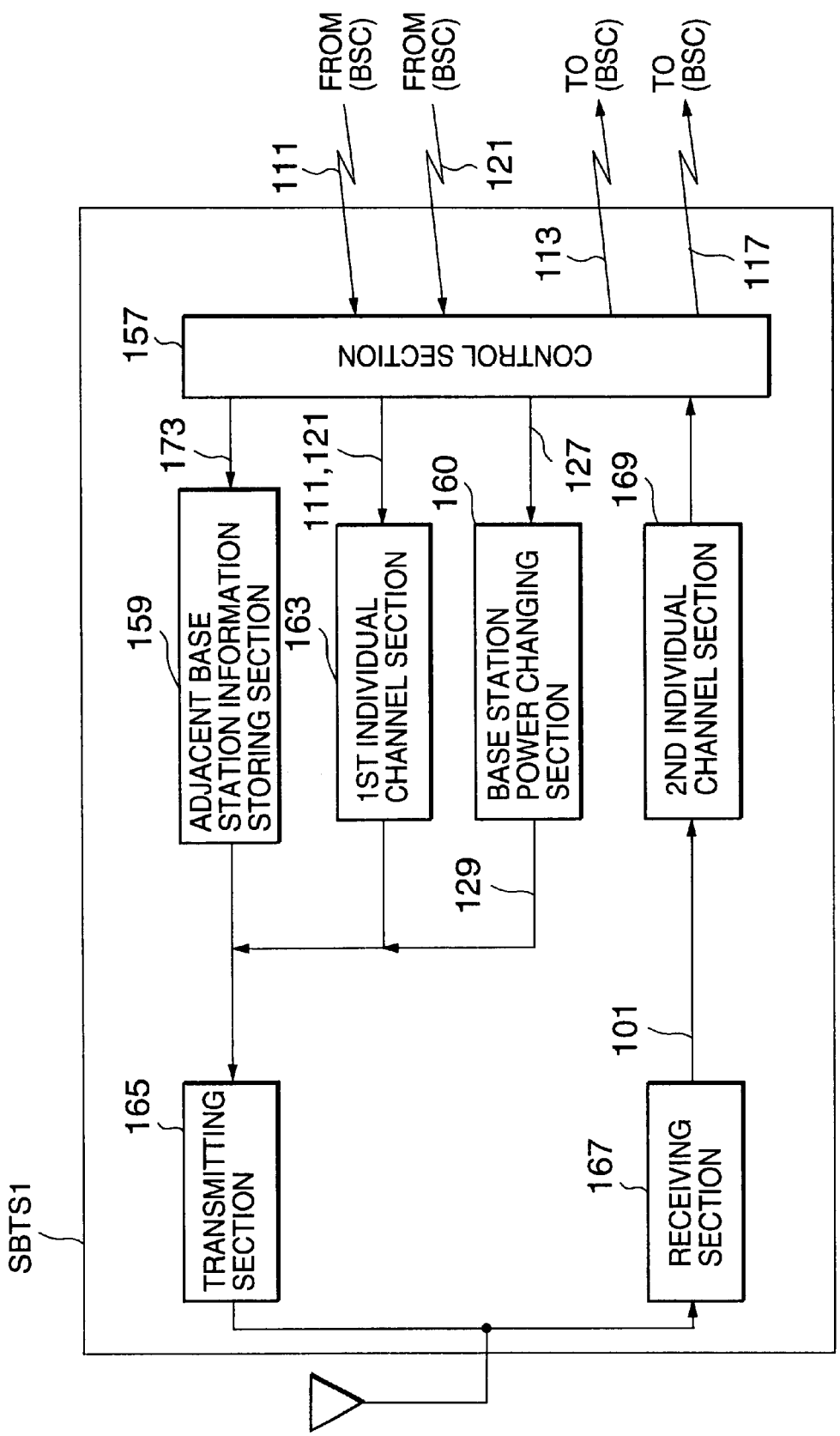
FIG. 17 is a block diagram illustrating the constitution of the base station shown in FIG. 15.

The constitution of each of the base stations of the CDMA mobile communication system according to the third embodiment will be described below with reference to FIG. 17. Although only the constitution of the base station BTS1 is described below, the other base stations BTSm have a similar constitution. Referring to FIG. 17, the base station BTS1 includes the control section 157, the adjacent base station information storing section 159, a base station power changing section 160, the first individual channel section 163, the transmitting section 165, the receiving section 167, and the second individual channel section 169. The control section 157 is connected to the base station control unit BSC by a wireless channel at all times, and outputs the base station control signal 173. In addition, the control section 157 receives the adjacent base station measurement result signal 117 and the supplementary base station measurement result signal 113 from the second individual channel section 169 and outputs these signals 117 and 113 to the base station control unit BSC. The control section 157 further receives the supplementary base station power measurement command 111 and the hand-over execute command 121 from the base station control unit BSC and outputs these commands 111 and 121 to the first individual channel section 163. The control section 157 further outputs the base station power control signal 127 from the second individual channel section 169 to the base station power changing section 160.

The adjacent base station information storing section 159 corresponds to the supplementary base station information storing section 139 shown in FIG. 16. Specifically, information for identifying a mobile station-associated base station and an adjacent base station is stored in the adjacent base station information storing section 159. The adjacent base station information storing section 159 outputs the adjacent base station signal 115 (the second identification signal) (refer to FIG. 15) in response to the base station control signal 173 from the control section 157.

The base station power changing section 160 has a function similar to the supplementary base station power changing section 142 shown in FIG. 16, and decodes a command incorporated in the base station power control signal 127 from the control section 157 and outputs the power change value signal 129 indicative of a power change value of transmission power to the transmitting section 165.

The transmitting section 165 performs spreading modulation on and outputs the talk signal or packet signal 101 from the first individual channel section 163 on the basis of the power change value signal 129 from the base station power changing section 160. The transmitting section 165 further performs spreading modulation on each of the supplementary base station power measurement command 111 and the hand-over execute command 121 from the first individual channel section 163, and output the modulated commands 111 and 121 to the mobile station MS1.

The receiving section 167 receives the talk signal or packet signal 101 from the mobile station MS1 by performing spreading demodulation, and outputs the demodulated talk signal or packet signal 101 to the second individual channel section 169. In addition, the receiving section 167 receives the adjacent base station measurement result signal 117, the supplementary base station measurement result signal 113, and the base station power control signal 127 from the mobile station MS1 by performing spreading demodulation, and outputs the demodulated signals 117, 113 and 127 to the second individual channel section 169.

Figure 18:
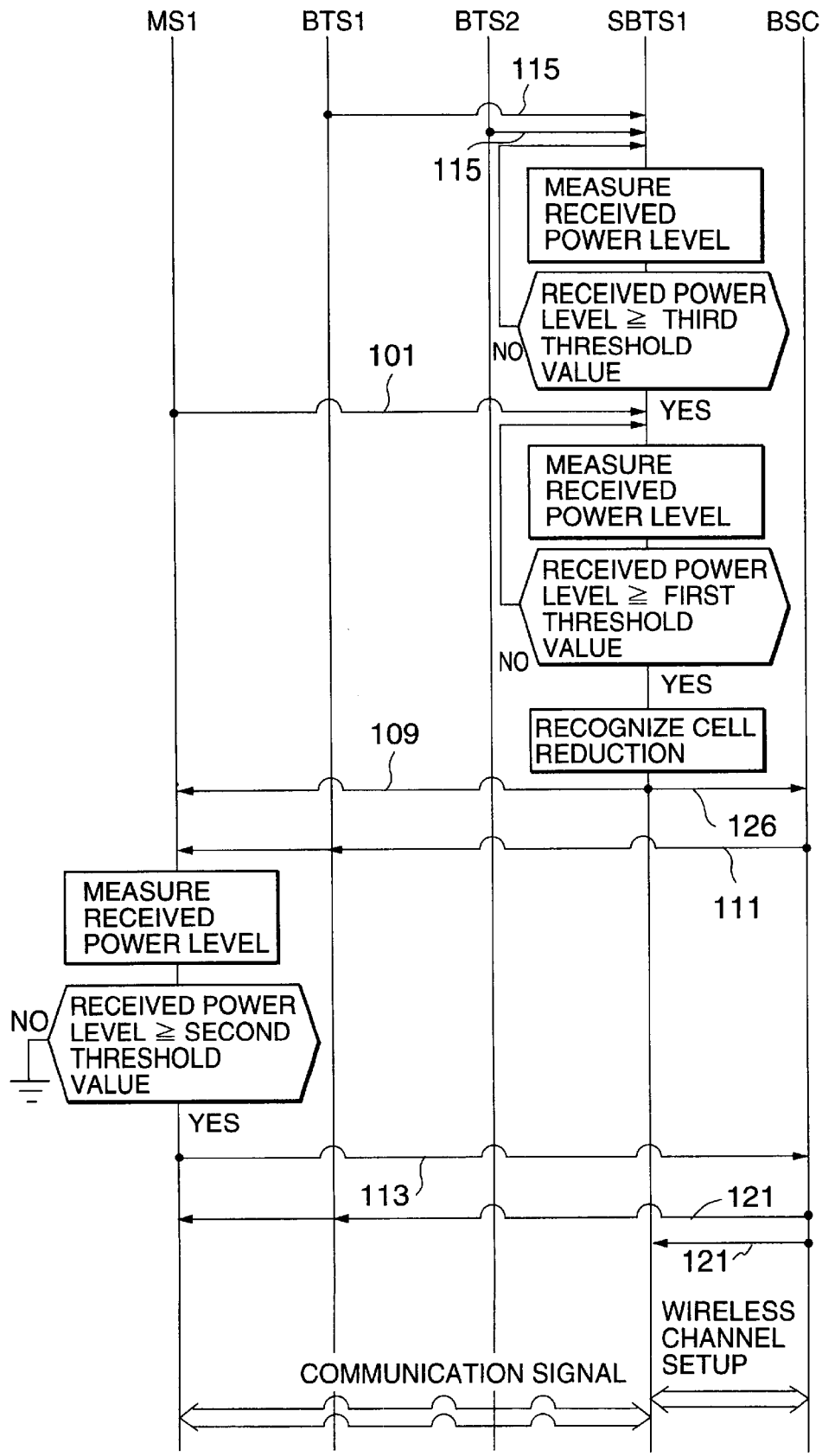
FIG. 18 is a view illustrating the operation of a service area supplementing method for the CDMA mobile communication system according to the third embodiment of the present invention.

A service area supplementing method for the CDMA mobile communication system according to the third embodiment will be described below. FIG. 18 shows the operational processing of operating a supplementary base station during recognition of a cell reduction.

Referring to FIGS. 15 and 18, a supplementary base station (only the supplementary base station SBTS1 is shown in FIGS. 15 and 18) adjacent to the base station BTS1 which is a mobile station-associated base station selectively generates on the basis of the adjacent base station information 125 the second comparison signal 124 (refer to FIG. 16), on the basis of the received power level data of the adjacent base station signal 115 from an adjacent base station (only the base station BTS2 is shown in FIGS. 15 and 18). This operation is executed through the following process. The supplementary base station SBTS1 receives the adjacent base station signal 115 by performing spreading demodulation on the basis of the adjacent base station information 125, and measures the received power level data of the adjacent base station signal 115 and compares the received power level data of the adjacent base station signal 115 with the preset threshold value (the third threshold value). If the received power level data of the adjacent base station signal 115 is lower than the third threshold value, the supplementary base station SBTS1 generates the second comparison signal 124 as the comparison result.

In the situation in which the second comparison signal 124 is generated, the supplementary base station SBTS1 selectively generates the first comparison signal 123 (refer to FIG. 16) on the basis of the received power level data of the talk signal or packet signal 101 in response to the talk signal or packet signal 101 from the mobile station MS1. This operation is executed through the following process. The supplementary base station SBTS1 receives the talk signal or packet signal 101 by performing spreading demodulation, measures the received power level data of the talk signal or packet signal 101, and compares the received power level data of the talk signal or packet signal 101 with a preset threshold value (a first threshold value). If the received power level data of the talk signal or packet signal 101 is higher than the first threshold value, the supplementary base station SBTS1 generates the first comparison signal 123 as the comparison result.

When the supplementary base station SBTS1 generates the first comparison signal 123 and the second comparison signal 124, the supplementary base station SBTS1 further outputs to the base station control unit BSC the operation informing signal 126 for informing the base station control unit BSC of the operation of the supplementary base station SBTS1, and also to the mobile station MS1 the supplementary base station signal 109 (the first identification signal) for identifying the supplementary base station SBTS1.

In order to recognize a cell reduction in the supplementary base station SBTS1, the first comparison signal 123 needs to be generated in the state in which the second comparison signal 124 is generated.

This fact means that even if the received power level data of the adjacent base station signal 115 is lower than the third threshold value, if the received power level data of the talk signal or packet signal 101 is lower than the first threshold value, it is not determined that a dead zone has occurred.

Figure 19:
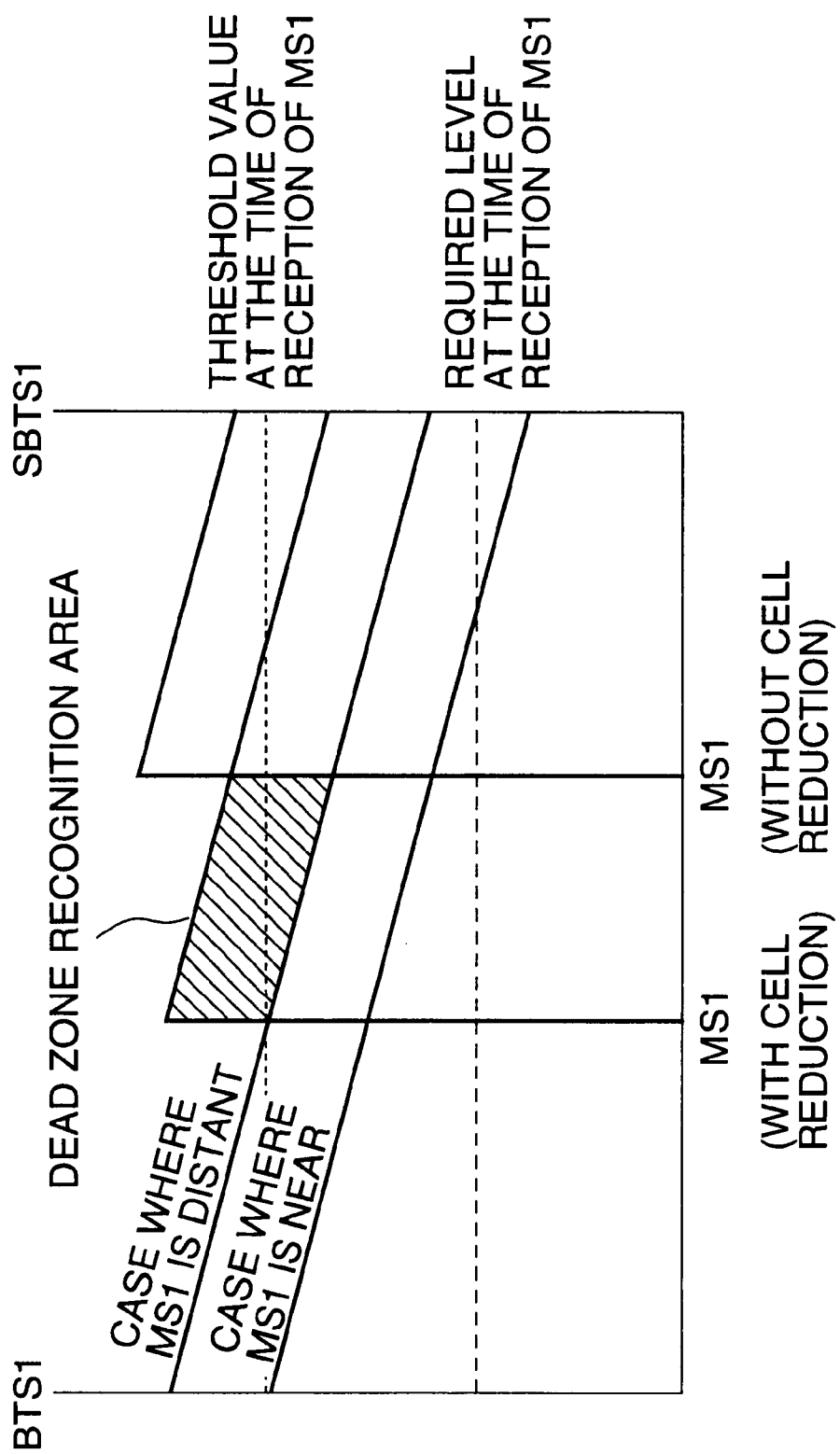
FIG. 19 is a view illustrating a decision criterion for recognizing a cell reduction in the third embodiment of the present invention.

A decision criterion for recognizing the cell reduction will be described below with reference to FIG. 19. FIG. 19 shows that the base station BTS1 is executing transmission power control on the mobile station MS1. If the mobile station MS1 exists near the base station BTS1, the received power level data of a signal from the base station BTS1 at the supplementary base station SBTS1 is low. On the other hand, if the mobile station MS1 exists at the cell boundary of the base station BTS1, the received power level data of a signal from the base station BTS1 at the supplementary base station SBTS1 is the highest.

During the occurrence of the cell reduction, since the mobile station MS1 exists at a location nearer the base station BTS1 than when the mobile station MS1 exists at a normal cell boundary of the base station BTS1, the power level received from the base station BTS1 at the supplementary base station SBTS1 has a value lower than the maximum value. Accordingly, if a certain threshold value is exceeded, it can be determined that the mobile station MS1 is approaching the cell boundary.

On the other hand, the received power level data of a signal from the mobile station MS1 at the supplementary base station SBTS1 is the highest when the mobile station MS1 exists at the cell boundary of the base station BTS1. Accordingly, if a certain threshold value is exceeded, it can be determined that the mobile station MS1 is approaching the cell boundary. In other words, if the power level received from the base station BTS1 and the power level received from the mobile station MS1 do not vary correspondingly, it can be determined that the cell reduction has occurred.

Through the above-described operation, a hand-over from the base station BTS1 to the selected supplementary base station SBTS1 is executed on the basis of the received power level data of the supplementary base station signal 109 from the supplementary base station SBTS1. This operation is executed through the following process. The base station control unit BSC outputs the supplementary base station power measurement command 111 to the mobile station MS1 via the base station BTS1 in response to the operation informing signal 126 from the supplementary base station SBTS1. The mobile station MS1 receives the supplementary base station signal 109 by performing spreading demodulation on the basis of the supplementary base station power measurement command 111, measures the received power level data of the supplementary base station signal 109, and compares the received power level data with the preset threshold value (the second threshold value). If the received power level data of the supplementary base station signal 109 is not lower than the second threshold value, the mobile station MS1 outputs the supplementary base station measurement result signal 113 to the base station control unit BSC via the base station BTS1. In response to the supplementary base station measurement result signal 113, the base station control unit BSC outputs the hand-over execute command 121 to the base station BTS1 and to the supplementary base station SBTS1, as well as to the mobile station MS1 via the base station BTS1. The supplementary base station SBTS1 executes a hand-over from the base station BTS1 in response to the hand-over execute command 121.

Figure 22:
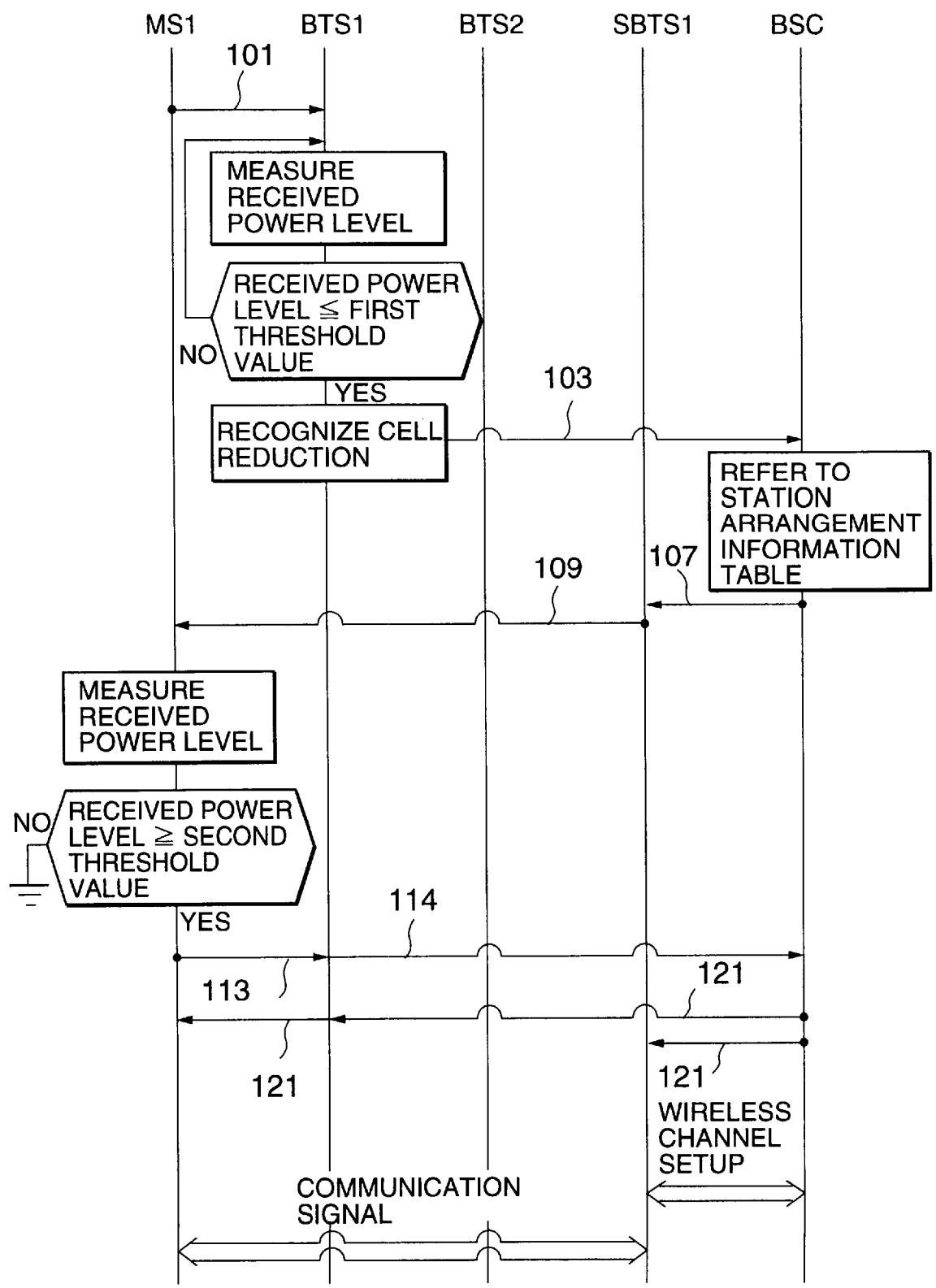
FIG. 22 is a view illustrating the operation of a service area supplementing method for the CDMA mobile communication system according to the fourth embodiment of the present invention.

A CDMA mobile communication system according to a fourth embodiment of the present invention will be described below with reference to FIGS. 20 to 22. The fourth embodiment and fifth and sixth embodiments which will be described later are modifications of the above-described first, second and third embodiments, respectively.

Figure 20:
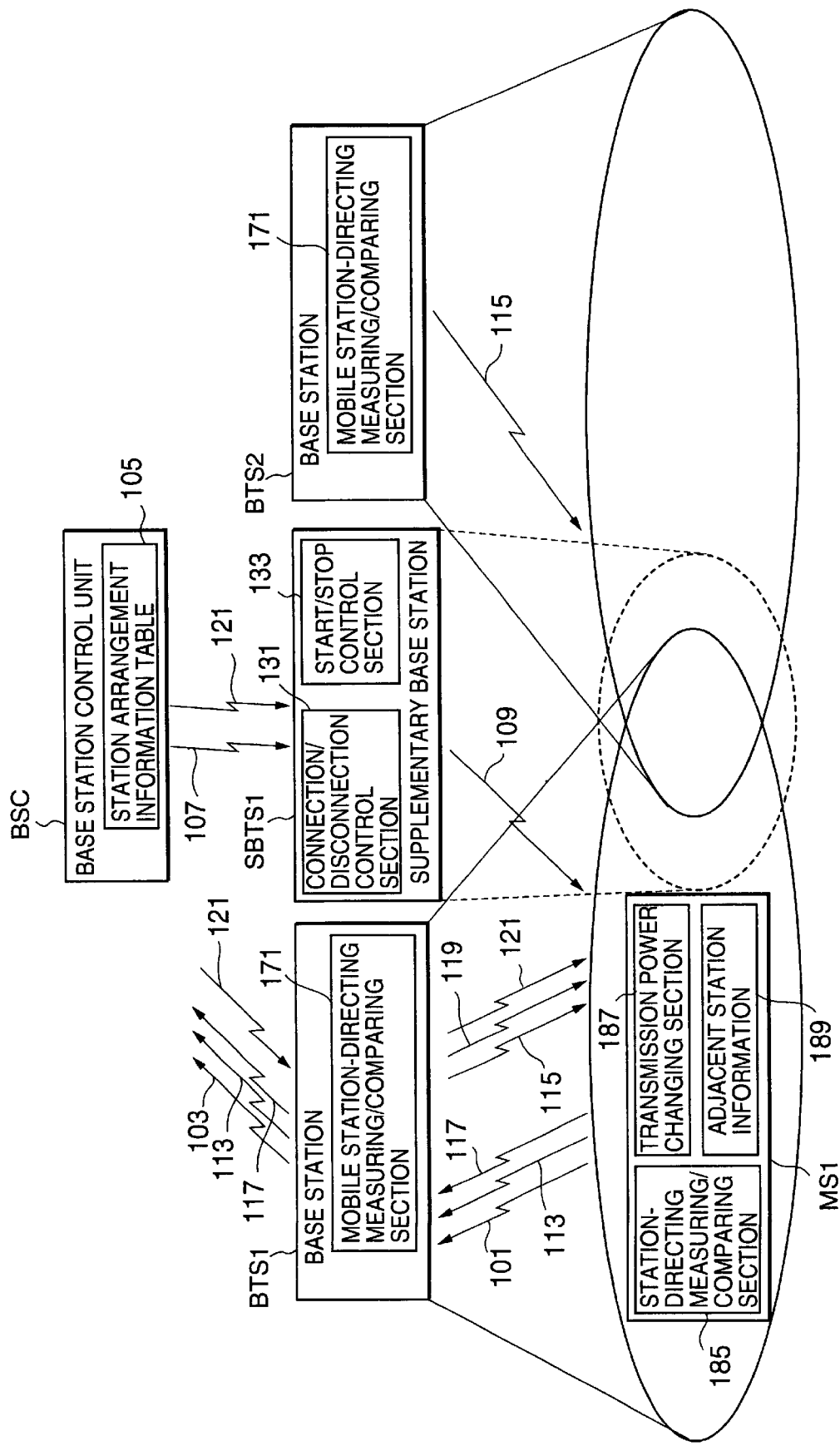
FIG. 20 is a view illustrating a CDMA mobile communication system according to a fourth embodiment of the present invention.

Referring to FIG. 20, the CDMA mobile communication system has, in addition to the above-described system constitution (refer to FIG. 2) of the first embodiment, adjacent station information 189 provided in the mobile station MS1. Incidentally, the constitutions of base stations and supplementary base stations are identical to those described previously in connection with the first embodiment, and in FIG. 20, identical reference numerals are used to denote portions (constituent elements and signals) identical to those used in the first embodiment, and the description of the same portions is omitted.

As shown in FIG. 21, the adjacent station information 189 is information which is composed of a spreading code and information on cells to be covered by a mobile station-associated base station (the base station BTS1 shown in FIG. 20), an adjacent base station (only the base station BTS2 is shown in FIG. 20), and a supplementary base station (only the supplementary base station SBTS1 is shown in FIG. 20) which is adjacent to the mobile station-associated base station.

Since the mobile station MS1 is provided with the adjacent station information 189, a part of the previously described processing process of the first embodiment can be omitted. The part of the previously described processing process is the processing process from the transmission to the reception of the supplementary base station power measurement command 111 to be outputted from the base station control unit BSC to the mobile station MS1 via the base station BTS1.

A service area supplementing method for the CDMA mobile communication system according to the fourth embodiment will be described below with reference to FIGS. 20 and 22. FIG. 22 corresponds to FIG. 11 which has previously been referred to in the description of the first embodiment.

The fourth embodiment performs the same operation as the first embodiment until the supplementary base station SBTS1 outputs the supplementary base station signal 109 in response to the operation start command 107 from the base station control unit BSC.

The mobile station MS1 receives the supplementary base station signal 109 by performing spreading demodulation on the basis of the preset adjacent station information 189, measures the received power level data of the supplementary base station signal 109, and compares the received power level data with the preset threshold value (the second threshold value). If the received power level data of the supplementary base station signal 109 is not lower than the second threshold value, the mobile station MS1 outputs the supplementary base station measurement result signal 113 to the base station control unit BSC via the base station BTS1.

The base station control unit BSC outputs the hand-over execute command 121 to the base station BTS1 and to the supplementary base station SBTS1 in response to the supplementary base station measurement result signal 113, as well as to the mobile station MS1 via the base station BTS1.

The supplementary base station SBTS1 sets up a wireless channel to the base station control unit BSC in response to the hand-over execute command 121, and executes a hand-over from the base station BTS1.

Figure 23:
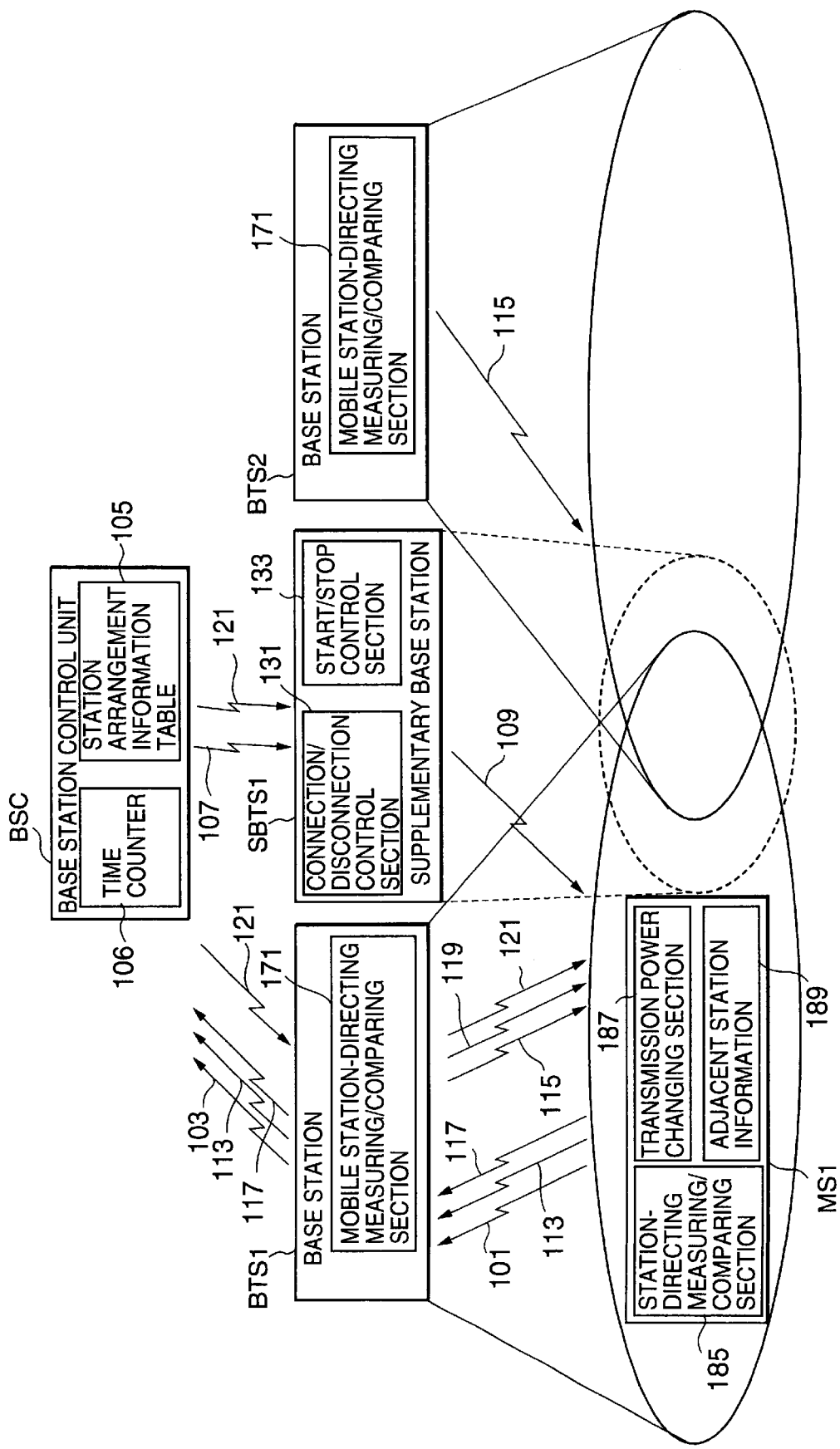
FIG. 23 is a view illustrating the constitution of a CDMA mobile communication system according a fifth embodiment of the present invention.
Figure 24:
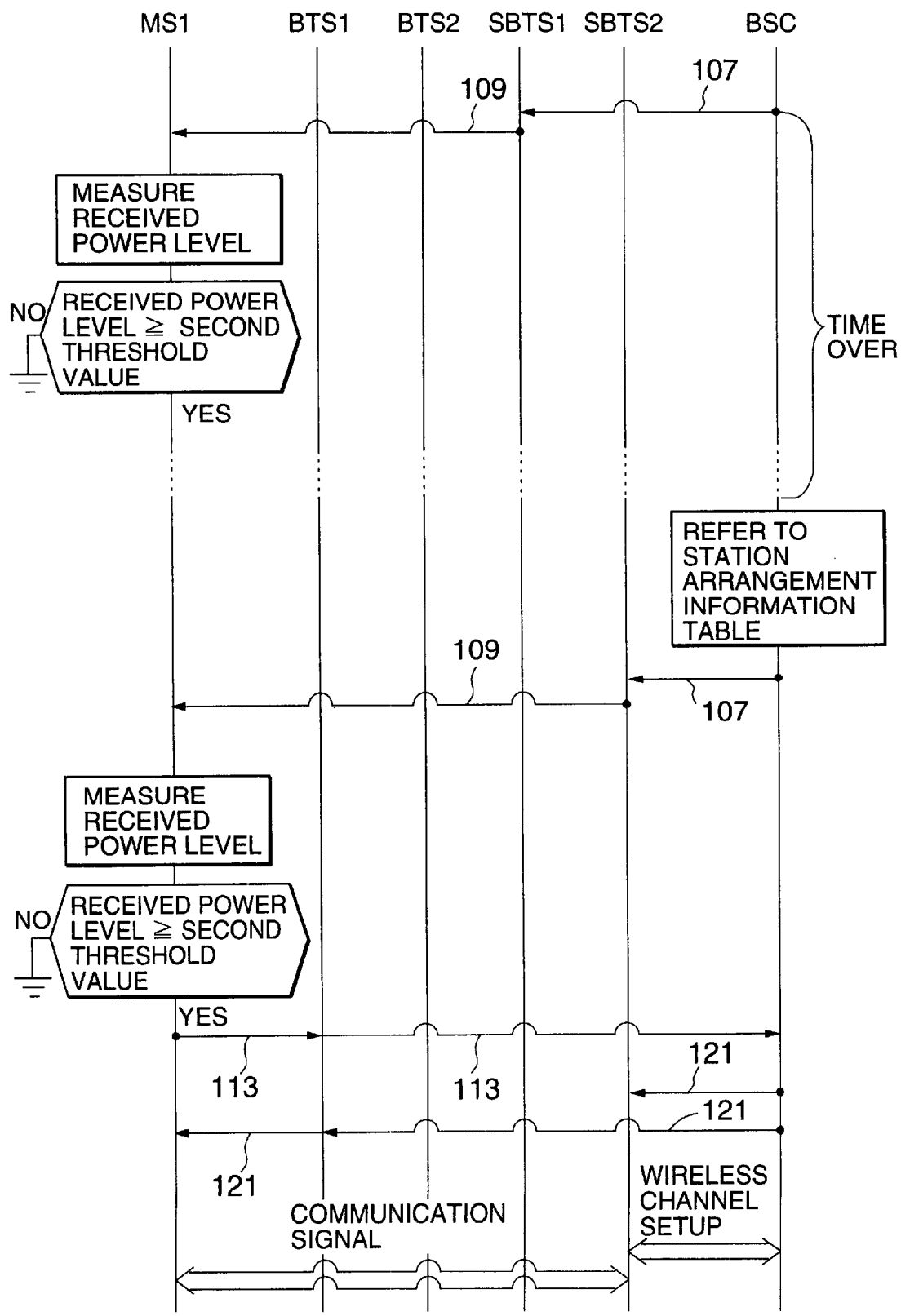
FIG. 24 is a view illustrating the operation of a service area supplementing method for the CDMA mobile communication system according to the fifth embodiment of the present invention.

A CDMA mobile communication system according to the fifth embodiment of the present invention will be described below with reference to FIGS. 23 and 24. Referring to FIG. 23, the CDMA mobile communication system according to the fifth embodiment has, in addition to the above-described system constitution (refer to FIG. 12) of the second embodiment, the adjacent station information 189 which is set in the mobile station MS1 in advance. The adjacent station information 189 is identical to that used in the fourth embodiment (refer to FIG. 20). The constitutions of base stations and supplementary base stations are identical to those described previously in connection with the first embodiment. In FIGS. 23 and 24, identical reference numerals are used to denote portions (constituent elements and signals) identical to those used in the second embodiment, and the description of the same portions is omitted.

A service area supplementing method for the CDMA mobile communication system according to the fifth embodiment of the present invention will be described below. FIG. 24 corresponds to FIG. 14 which has previously been referred to in the description of the second embodiment. The base station control unit BSC refers to the station arrangement information table 105 on the basis of the adjacent base station measurement result signal 117 from the mobile station MS1 in response to the hand-over request signal 103 from the base station BTS1 which is a mobile station-associated base station. The above-described operation is identical to the operation of the second embodiment which has been described with reference to FIG. 13.

Referring to FIG. 24, the base station control unit BSC refers to the station arrangement information table 105 and selects a supplementary base station (the supplementary base station SBTS1 shown in FIG. 24) (the present supplementary base station), and outputs the operation start command 107 which commands the selected supplementary base station SBTS1 to start an operation. The method of selecting the present supplementary base station on the basis of the adjacent base station measurement result signal 117 and the station arrangement information table 105 is the same as that used in the second embodiment.

In addition, the base station control unit BSC counts within a preset waiting time a time period which elapses from a time instant when the operation start command 107 is outputted until the base station control unit BSC receives the supplementary base station measurement result signal 113. The supplementary base station measurement result signal 113 is selectively outputted by the mobile station MS1 on the basis of the received power level data of the supplementary base station signal 109 (the first identification signal) from the supplementary base station SBTS1, and the supplementary base station measurement result signal 113 is outputted to the base station control unit BSC via the base station BTS1. In other words, the mobile station MS1 receives the supplementary base station signal 109 by performing spreading demodulation in response to a supplementary base station power measurement command from the base station control unit BSC, and measures the received power level data of the supplementary base station signal 109.

The mobile station MS1 compares the received power level data of the supplementary base station signal 109 with the preset value (the second threshold value). If the received power level data is not lower than the second threshold value, the mobile station MS1 outputs the supplementary base station measurement result signal 113 to the base station control unit BSC via the base station BTS1.

If the base station control unit BSC receives within the preset waiting time the supplementary base station measurement result signal 113 which corresponds to the supplementary base station SBTS1, the base station control unit BSC outputs the hand-over execute command 121 to the base station BTS1 and to the supplementary base station SBTS1, as well as to the mobile station MS1 via the base station BTS1 (this operation is not shown in FIG. 23 nor 24).

On the other hand, if the base station control unit BSC does not receive within the preset waiting time the supplementary base station measurement result signal 113 which corresponds to the supplementary base station SBTS1, the base station control unit BSC again refers to the station arrangement information table 105 on the basis of the adjacent base station measurement result signal 117 (not shown) and outputs the operation start command 107 to a newly selected supplementary base station (the supplementary base station SBTS2 shown in FIG. 24) (the next supplementary base station). The method of selecting the next supplementary base station on the basis of the adjacent base station measurement result signal 117 and the station arrangement information table 105 is identical to that used in the second embodiment.

The adjacent base station measurement result signal 117 for selecting the supplementary base station SBTS2 (the next supplementary base station) may be obtained by storing as data the adjacent base station measurement result signal 117 used to select the supplementary base station SBTS1 (the present supplementary base station) and reusing the stored data, or by receiving a new adjacent base station measurement result signal 117 via the base station BTS1.

Similarly to the supplementary base station SBTS1, the supplementary base station SBTS2 outputs the supplementary base station signal 109 to the mobile station MS1 in response to the operation start command 107. The base station control unit BSC outputs the hand-over execute command 121 to the base station BTS1 and to the supplementary base station SBTS2 in response to the reception of the supplementary base station measurement result signal 113 which corresponds to the supplementary base station SBTS2, from the mobile station MS1, as well as to the mobile station MS1 via the base station BTS1.

The supplementary base station SBTS1 or the supplementary base station SBTS2 sets up a wireless channel (not shown) to the base station control unit BSC, and executes a hand-over from the base station BTS1 (only the supplementary base station SBTS1 is shown in FIG. 23).

Figure 25:
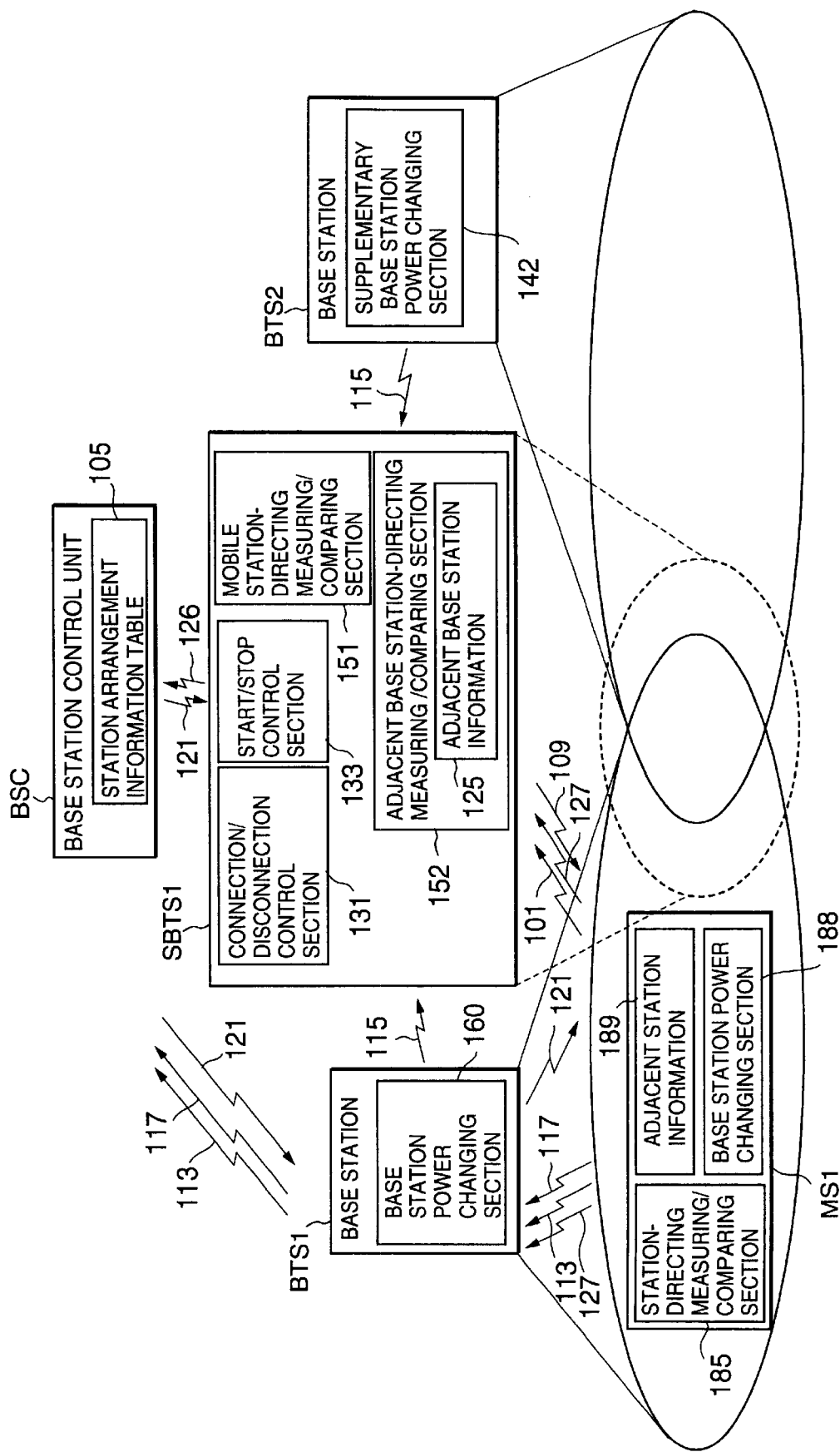
FIG. 25 is a view illustrating the constitution of a CDMA mobile communication system according to a sixth embodiment of the present invention.
Figure 26:
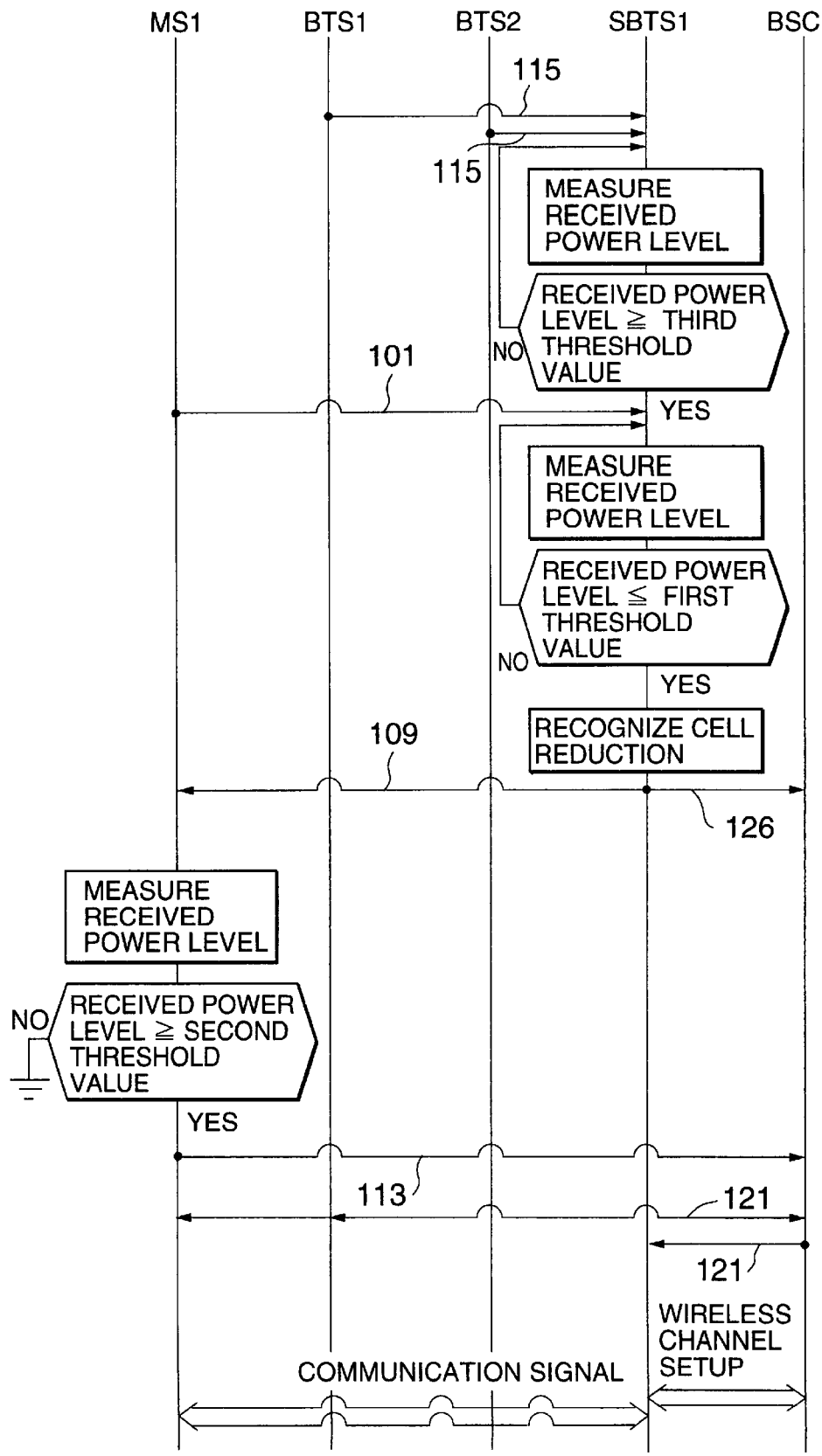
FIG. 26 is a view illustrating the operation of a service area supplementing method for the CDMA mobile communication system according to the sixth embodiment of the present invention.

A CDMA mobile communication system according to the sixth embodiment of the present invention will be described below with reference to FIGS. 25 and 26. Referring to FIG. 25, the CDMA mobile communication system according to the sixth embodiment has, in addition to the above-described system constitution (refer to FIG. 15) of the third embodiment, the adjacent station information 189 which is set in the mobile station MS1 in advance. The adjacent station information 189 is identical to that used in each of the fourth and the fifth embodiments. The constitutions of base stations and supplementary base stations are identical to those described previously in connection with the third embodiment. In FIGS. 25 and 26, identical reference numerals are used to denote portions (constituent elements and signals) identical to those used in the third embodiment, and the description of the same portions is omitted.

A service area supplementing method for the CDMA mobile communication system according to the sixth embodiment of the present invention will be described below. FIG. 26 corresponds to FIG. 18 which has previously been referred to in the description of the second embodiment.

A supplementary base station (only the supplementary base station SBTS1 is shown in FIG. 25) recognizes a cell reduction on the basis of the received power level data of the adjacent base station signal 115 and the received power level data of the talk signal or packet signal 101, and outputs the operation informing signal 126 to the base station control unit BSC and the supplementary base station signal 109 (the first identification signal) to the mobile station MS1. The above-described operation is identical to that described previously in connection with the third embodiment.

The mobile station MS1 receives the supplementary base station signal 109 by performing spreading demodulation on the basis of the preset adjacent station information 189, measures the received power level data of the supplementary base station signal 109, and compares the received power level data with the preset threshold value (the second threshold value). If the received power level data of the supplementary base station signal 109 is not lower than the second threshold value, the mobile station MS1 outputs the supplementary base station measurement result signal 113.

The base station control unit BSC outputs the hand-over execute command 121 to the base station BTS1 and to the supplementary base station SBTS1 in response to the supplementary base station measurement result signal 113 from the mobile station MS1 via the base station BTS1, as well as to the mobile station MS1 via the base station BTS1.

The supplementary base station SBTS1 sets up a wireless channel (not shown) to the base station control unit BSC in response to the hand-over execute command 121, and executes a hand-over from the base station BTS1.

As is apparent from the foregoing description, the CDMA mobile communication system and the service area supplementing method according to the present invention are capable of reducing approach links even in a cell area where a variation in traffic frequently occurs, by operating a supplementary base station for a cell area which is reduced, only when traffic increases.

What is claimed is:

1. A CDMA mobile communication system for carrying out communication by a CDMA communication method, comprising: a mobile station; a base station to be connected to said mobile station by a wireless channel; at least one adjacent base station adjacent to said base station; and a base station control unit to be connected to said base station and to said at least one adjacent base station by wireless channels, at least one supplementary base station being disposed for covering an area near a boundary of a service area to be covered by said base station and an area near a boundary of a service area to be covered by said at least one adjacent base station, said base station comprising a mobile station-directing measuring/comparing section for selectively outputting a hand-over request signal indicating that a hand-over to said at least one adjacent base station is impossible, on the basis of data indicative of a received power level of a talk signal or a packet signal from said mobile station, said base station control unit comprising a station arrangement information table having information indicative of an arrangement of said base station and said at least one supplementary base station with respect to a service area, said base station control unit referring to said station arrangement information table in response to said hand-over request signal, selecting a supplementary base station that executes the hand-over, and outputting to the selected supplementary base station an operation start command which commands said selected supplementary base station to start an operation, said base station control unit also outputting, when a first identification signal which is information for identifying said selected supplementary base station is outputted from said selected supplementary base station to said mobile station, a supplementary base station power measurement command so that said mobile station selectively outputs a supplementary base station measurement result signal on data indicative of a received power level of said first identification signal, said base station control unit further outputting a hand-over execute command in response to said supplementary base station measurement result signal, said at least one supplementary base station comprising:
a connection/disconnection control section for generating a control signal in response to said operation start command and for setting up a wireless channel to said base station control unit in response to said hand-over execute command; and
a start/stop control section for outputting a start signal in response to said control signal so that said first identification signal is outputted.

2. The system of claim 1, wherein said supplementary base station is arranged near an intersection, or a point of near contact, of said service areas of said base station and said at least one adjacent base station.

3. A service area supplementing method for a CDMA mobile communication system for carrying out communication by a CDMA communication method, said CDMA mobile communication system comprising: a mobile station; a base station to be connected to said mobile station by a wireless channel; at least one adjacent base station adjacent to said base station; and a base station control unit to be connected to said base station and to said at least one adjacent base station by wireless channels, at least one supplementary base station being disposed for covering an area near a boundary of a service area to be covered by said base station and an area near a boundary of a service area to be covered by said at least one adjacent base station, said service area supplementing method comprising:

a step (a) of selectively outputting a hand-over request signal indicating that a hand-over to said at least one adjacent base station is impossible, on the basis of data indicative of a received power level of a talk signal or a packet signal;

a step (b) of selecting a supplementary base station that executes the hand-over, in response to said hand-over request signal, and outputting an operation start command which commands said selected supplementary base station to start an operation; and a step (c) of executing the hand-over from said base station to said selected supplementary base station on the basis of data indicative of a received power level of a first identification signal which is outputted from said selected supplementary base station as information for identifying said selected supplementary base station, in response to said operation start command.

4. A service area supplementing method for a CDMA mobile communication system according to claim 3, wherein said step (a) comprises:

measuring said data indicative of said received power level of said talk signal or said packet signal in response to said talk signal or said packet signal;

comparing said data indicative of said received power level of said talk signal or said packet signal with a first threshold value; and outputting said hand-over request signal when said data indicative of said received power level of said talk signal or said packet signal is lower than said first threshold value.

5. A service area supplementing method for a CDMA mobile communication system according to claim 3, wherein said step (b) comprises:

referring to a station arrangement information table having information indicative of an arrangement of said base station and said at least one supplementary base station with respect to a service area, in response to said hand-over request signal;

referring to said station arrangement information table and selecting a supplementary base station that executes the hand-over; and outputting said operation start command to said selected supplementary base station.

6. A service area supplementing method for a CDMA mobile communication system according to claim 3, wherein said step (c) comprises:

outputting said first identification signal in response to said operation start command;

outputting a supplementary base station power measurement command when said first identification signal is outputted;

measuring said data indicative of said received power level of said first identification signal in response to said supplementary base station power measurement command, comparing said data indicative of said received power level of said first identification signal with a second threshold value, and outputting a supplementary base station measurement result signal when said data indicative of said received power level of said first identification signal is not lower than said second threshold value;

outputting a hand-over execute command in response to said supplementary base station measurement result signal; and executing the hand-over from said base station to said selected supplementary base station in response to said hand-over execute command.

7. A service area supplementing method for a CDMA mobile communication system according to claim 3, wherein said step (c) comprises:

generating said first identification signal in response to said operation start command;

measuring said data indicative of said received power level of said first identification signal in response to said first identification signal on the basis of adjacent station information which is information for identifying said adjacent base station and said at least one supplementary base station, comparing said data indicative of said received power level of said first identification signal with a second threshold value, and outputting a supplementary base station measurement result signal when said data indicative of said received power level of said first identification signal is not lower than said second threshold value;

outputting a hand-over execute command in response to said supplementary base station measurement result signal; and executing the hand-over from said base station to said selected supplementary base station in response to said hand-over execute command.

8. The method of claim 3, wherein said supplementary base station is arranged near an intersection, or a point of near contact, of said service areas of said base station and said at least one adjacent base station.

9. A CDMA mobile -communication system for carrying out communication by a CDMA communication method, comprising: a mobile station; a base station to be connected to said mobile station by a wireless channel; at least one adjacent base station adjacent to said base station; and a base station control unit to be connected to said base station and to said at least one adjacent base station by wireless channels, at least two supplementary base stations being disposed for covering an area near a boundary of a service area to be covered by said base station and an area near a boundary of a service area to be covered by said at least one adjacent base station, said base station comprising a mobile station-directing measuring/comparing section for selectively outputting a hand-over request signal indicating that a hand-over to said at least one adjacent base station is impossible, on the basis of data indicative of a received power level of a talk signal or a packet signal from said mobile station, said base station control unit comprising a time measuring counter and a station arrangement information table having information indicative of an arrangement of said base station and said at least two supplementary base stations with respect to a service area, said base station control unit selecting the present supplementary base station that executes the hand-over and outputting an operation start command which commands the selected present supplementary base station to start an operation, in response to said hand-over request signal and on the basis of an adjacent base station measurement result signal selectively outputted from said mobile station on the basis of said data indicative of a received power level of a second identification signal which is information for identifying said adjacent base station, said base station control unit also outputting a supplementary base station power measurement command when a first identification signal which is information for identifying said present supplementary base station is outputted from said present supplementary base station to said mobile station, said base station control unit further selectively executing output of a hand-over execute command to said present supplementary base station and output of said hand-over execute command to a newly selected next supplementary base station that executes the hand-over, on the basis of a waiting time which elapses until reception of a supplementary base station measurement result signal selectively outputted from said mobile station on the basis of said data indicative of said received power level of said first identification signal, each of said at least two supplementary base stations comprising:
　a connection/disconnection control section for generating a control signal in response to said operation start command and for setting up a wireless channel to said base station control unit in response to said hand-over execute command; and
　a start/stop control section for outputting a start signal in response to said control signal so that said first identification signal is outputted.

10. The system of claim 9, wherein said supplementary base station is arranged near an intersection, or a point of near contact, of said service areas of said base station and said at least one adjacent base station.

11. A service area supplementing method for a CDMA mobile communication system for carrying out communication by a CDMA communication method, said CDMA mobile communication system comprising: a mobile station; a base station to be connected to said mobile station by a wireless channel; at least one adjacent base station adjacent to said base station; and a base station control unit to be connected to said base station and to said at least one adjacent base station by wireless channels,
　at least two supplementary base stations being disposed for covering an area near a boundary of a service area to be covered by said base station and an area near a boundary of a service area to be covered by said at least one adjacent base station,
　said service area supplementing method comprising:
　　a step (a) of selectively outputting a hand-over request signal indicating that a hand-over to said at least one adjacent base station is impossible, on the basis of data indicative of a received power level of a talk signal or a packet signal;
　　a step (b) of selectively executing output of a hand-over execute command to a selected present supplementary base station and output of said hand-over execute command to a newly selected next supplementary base station, in response to said hand-over request signal and on the basis of a waiting time which elapses until reception of a supplementary base station measurement result signal selectively outputted from said mobile station on the basis of said data indicative of said received power level of said first identification signal which is information for identifying said selected present supplementary base station; and
　　a step (c) of executing the hand-over from said base station to said selected present supplementary base station or to said next supplementary base station in response to said hand-over execute command.

12. A service area supplementing method for a CDMA mobile communication system according to claim 11, wherein said step (a) comprises:
　measuring said data indicative of said received power level of said talk signal or said packet signal in response to said talk signal or said packet signal;
　comparing said data indicative of said received power level of said talk signal or said packet signal with a first threshold value; and
　outputting said hand-over request signal when said data indicative of said received power level of said talk signal or said packet signal is lower than said first threshold value.

13. A service area supplementing method for a CDMA mobile communication system according to claim 11, wherein said step (b) comprises:
　measuring data indicative of a received power level of a second identification signal which is information for identifying said adjacent base station, in response to said hand-over request signal;
　comparing said data indicative of said received power level of said second identification signal with a third threshold value, and if said data indicative of said received power level of said second identification signal is not lower than said third threshold value, referring to a station arrangement information table having information indicative of an arrangement of said base station and said at least two supplementary base stations with respect to a service area, on the basis of said adjacent base station measurement result signal outputted from said mobile station;
　referring to said station arrangement information table and selecting said present supplementary base station, and outputting an operation start command which commands said present supplementary base station to start an operation;
　generating said first identification signal in response to said operation start command;
　outputting a supplementary base station power measurement command when said first identification signal is outputted;
　comparing said data indicative of said received power level of said first identification signal with said second threshold value and counting within a preset waiting time a time period which elapses from a time instant when the supplementary base station power measurement command is outputted until reception of a supplementary base station measurement result signal which is outputted when said data indicative of said received power level data of said first identification signal is not lower than said second threshold value;

referring to said station arrangement information table, if said supplementary base station measurement result signal is not received within said preset waiting time, on the basis of said adjacent base station measurement result signal and outputting said operation start command to a newly selected next supplementary base station, and also outputting a hand-over execute command in response to reception of said supplementary base station measurement result signal; and outputting the hand-over execute command to said present supplementary base station, if said supplementary base station measurement result signal is received within said preset waiting time.

14. A service area supplementing method for a CDMA mobile communication system according to claim 11, wherein said step (b) comprises:

measuring data indicative of a received power level of a second identification signal which is information for identifying said adjacent base station, in response to said hand-over request signal;

comparing said data indicative of said received power level of said second identification signal with a third threshold value, and if said data indicative of said received power level of said second identification signal is not lower than said third threshold value, referring to a station arrangement information table having information indicative of an arrangement of said base station and said at least two supplementary base stations with respect to a service area, on the basis of said adjacent base station measurement result signal outputted from said mobile station;

referring to said station arrangement information table and selecting said present supplementary base station, and outputting an operation start command which commands said present supplementary base station to start an operation;

comparing said data indicative of said received power level of said first identification signal with said second threshold value and counting within a preset waiting time a time period which elapses from a time instant when said operation start command is outputted until reception of a supplementary base station measurement result signal which is outputted when said data indicative of said received power level data of said first identification signal is not lower than said second threshold value;

referring to said station arrangement information table, if said supplementary base station measurement result signal is not received within said preset waiting time, on the basis of said adjacent base station measurement result signal and outputting said operation start command to a newly selected next supplementary base station, and also outputting a hand-over execute command in response to reception of said supplementary base station measurement result signal; and outputting the hand-over execute command to said present supplementary base station, if said supplementary base station measurement result signal is received within said preset waiting time.

15. The method of claim 11, wherein said supplementary base station is arranged near an intersection, or a point of near contact, of said service areas of said base station and said at least one adjacent base station.

16. A CDMA mobile communication system for carrying out communication by a CDMA communication method, comprising: a mobile station; a base station to be connected to said mobile station by a wireless channel; at least one adjacent base station adjacent to said base station; and a base station control unit to be connected to said base station and to said at least one adjacent base station by wireless channels, at least one supplementary base station being disposed for covering an area near a boundary of a service area to be covered by said base station and an area near a boundary of a service area to be covered by said at least one adjacent base station, said at least one supplementary base station comprising:

a mobile station-directing measuring/comparing section for selectively outputting a first comparison signal on the basis of data indicative of a received power level of a talk signal or a packet signal from said mobile station;

an adjacent base station-directing power measuring/comparing section for selectively outputting a second comparison signal on the basis of data indicative of a received power level of a second identification signal which is information for identifying said adjacent base station, said second identification signal being outputted from said adjacent base station on the basis of adjacent base station information which is preset as information for identifying said adjacent base station;

a start/stop control section for outputting an operation informing signal in response to said first comparison signal and said second comparison signal and outputting a start signal so that a first identification signal which is information for identifying said supplementary base station is outputted; and a connection/disconnection control section for outputting said operation informing signal to said base station control unit and setting up a wireless channel to said base station control unit in response to a hand-over execute command from said base station control unit, said base station being arranged to output said second identification signal, said base station control unit outputting a supplementary base station power measurement command to said mobile station in response to said operation informing signal, said base station control unit also outputting the hand-over execute command in response to a supplementary base station measurement result signal selectively outputted from said mobile station on the basis of data indicative of a received power level data of said first identification signal.

17. The system of claim 16, wherein said supplementary base station is arranged near an intersection, or a point of near contact, of said service areas of said base station and said at least one adjacent base station.

18. A supplementary base station for a CDMA mobile communication system for carrying out communication by a CDMA communication method, comprising: a mobile station; a base station to be connected to said mobile station by a wireless channel; at least one adjacent base station adjacent to said base station; and a base station control unit to be connected to said base station and to said at least one adjacent base station by wireless channels, said supplementary base station being disposed at least one location to cover an area near a boundary of a service area to be covered by said base station and an area near a boundary of a service area to be covered by said at least one adjacent base station said supplementary base station comprising:
  a mobile station-directing power measuring/comparing section for selectively outputting a first comparison signal on the basis of data indicative of a received power level of a talk signal or a packet signal from said mobile station;
  an adjacent base station-directing power measuring/comparing section for selectively outputting a second comparison signal on the basis of data indicative of a received power level of a second identification signal which is information for identifying said adjacent base station, said second identification signal being outputted from said adjacent base station on the basis of adjacent base station information which is preset as information for identifying said adjacent base station;
  a start/stop control section for outputting an operation informing signal in response to said first comparison signal and said second comparison signal and outputting a start signal so that a first identification signal which is information for identifying said supplementary base station is outputted; and
  a connection/disconnection control section for outputting said operation informing signal to said base station control unit and setting up a wireless channel to said base station control unit in response to a hand-over execute command from said base station control unit.

19. The system of claim 18, wherein said supplementary base station is arranged near an intersection, or a point of near contact, of said service areas of said base station and said at least one adjacent base station.

20. A service area supplementing method for a CDMA mobile communication system for carrying out communication by a CDMA communication method, said CDMA mobile communication system comprising: a mobile station; a base station to be connected to said mobile station by a wireless channel; at least one adjacent base station adjacent to said base station; and a base station control unit to be connected to said base station and to said at least one adjacent base station by wireless channels,
  at least one supplementary base station being disposed at least one location to cover an area near a boundary of a service area to be covered by said base station and an area near a boundary of a service area to be covered by said at least one adjacent base station
said service area supplementing method comprising:
  a step (a) of selectively outputting a first comparison signal on the basis of data indicative of a received power level of a talk signal or a packet signal;
  a step (b) of selectively outputting a second comparison signal on the basis of data indicative of a received power level of a second identification signal which is information for identifying said adjacent base station, said second identification signal being outputted from said adjacent base station on the basis of adjacent base station information which is preset as information for identifying said adjacent base station;
  a step (c) of outputting an operation informing signal to inform an operation of said supplementary base station in response to said first comparison signal and said second comparison signal and outputting a start signal so that a first identification signal which is information for identifying said supplementary base station is outputted; and
  a step (d) of executing a hand-over from said base station to said supplementary base station on the basis of data indicative of a received power level data of said first identification signal outputted from said supplementary base station.

21. A service area supplementing method for a CDMA mobile communication system according to claim 20, wherein said step (a) comprises:
  measuring said data indicative of said received power level of said talk signal or said packet signal in response to said talk signal or said packet signal;
  comparing said data indicative of said received power level of said talk signal or said packet signal with a first threshold value; and
  outputting said first comparison signal as a comparison result, if said data indicative of said received power level of said talk signal or said packet signal is higher than said first threshold value.

22. A service area supplementing method for a CDMA mobile communication system according to claim 20, wherein said step (b) comprises:
  measuring said data indicative of said received power level of said second identification signal in response to said second identification signal on the basis of said adjacent base station information;
  comparing said data indicative of said received power level of said second identification signal with a third threshold value; and
  outputting said second comparison signal as a comparison result, if said data indicative of said received power level of said second identification signal is lower than said third threshold value.

23. A service area supplementing method for a CDMA mobile communication system according to claim 15, wherein said step (d) comprises:
  measuring said data indicative of said received power level of said first identification signal in response to a supplementary base station power measurement command;
  comparing said data indicative of said received power level of said first identification signal with a second threshold value, and outputting a supplementary base station measurement result signal to said mobile station, if said data indicative of said received power level of said first identification signal is not lower than said second threshold value;
  outputting a hand-over execute command in response to said supplementary base station measurement result signal; and
  executing the hand-over from said base station to said supplementary base station in response to said hand-over execute command.

24. A service area supplementing method for a CDMA mobile communication system according to claim 15, wherein said step (d) comprises:
  measuring said data indicative of said received power level of said first identification signal in response to said first identification signal on the basis of said adjacent station information which is information for identifying said adjacent base station and said supplementary base station;
  comparing said data indicative of said received power level of said first identification signal with a second threshold value, and outputting a supplementary base station measurement result signal to said mobile station, if said data indicative of said received power level of said first identification signal is not lower than said second threshold value;

outputting a hand-over execute command in response to said supplementary base station measurement result signal; and executing the hand-over from said base station to said supplementary base station in response to said hand-over execute command.

25. The method of claim 20, wherein said supplementary base station is arranged near an intersection, or a point of near contact, of said service areas of said base station and said at least one adjacent base station.

* * * * *